United States Patent
Matsumura et al.

(10) Patent No.: US 6,347,119 B2
(45) Date of Patent: Feb. 12, 2002

(54) COMMUNICATION APPARATUS, COMMUNICATION METHOD AND STORAGE MEDIUM

(75) Inventors: Youichi Matsumura; Katsumi Tahara; Hiroaki Seto; Eisaburo Itakura, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/737,360

(22) Filed: Dec. 15, 2000

Related U.S. Application Data

(63) Continuation of application No. PCT/JP00/02493, filed on Apr. 17, 2000.

(30) Foreign Application Priority Data

Apr. 16, 1999 (JP) ............................................. 11-110135

(51) Int. Cl.$^7$ ................................................. H04B 1/66
(52) U.S. Cl. ................................................. 375/240.28
(58) Field of Search ..................... 375/240.26, 240.27, 375/240.28; 386/68, 81, 82, 98, 111, 124; 348/384, 464, 465, 500; H04N 7/12

(56) References Cited

U.S. PATENT DOCUMENTS

| | | | | |
|---|---|---|---|---|
| 5,565,923 A | * | 10/1996 | Zdepski | 375/240.26 |
| 5,966,387 A | * | 10/1999 | Cloutier | 370/516 |
| 6,011,899 A | * | 1/2000 | Ohishi et al. | 386/98 |
| 6,028,648 A | * | 2/2000 | Yu | 375/240.27 |
| 6,049,886 A | * | 4/2000 | Motoyama | 713/503 |

FOREIGN PATENT DOCUMENTS

| | | |
|---|---|---|
| JP | 6-97927 | 4/1994 |
| JP | 7-66814 | 3/1995 |
| JP | 8-212701 | 8/1996 |
| JP | 8-307863 | 11/1996 |
| JP | 8-321836 | 12/1996 |
| JP | 9-64874 | 3/1997 |
| JP | 11-41256 | 2/1999 |
| JP | 11-136224 | 5/1999 |
| JP | 11-234308 | 8/1999 |

* cited by examiner

Primary Examiner—Nhon T Diep
(74) Attorney, Agent, or Firm—Frommer Lawrence & Haug LLP; William S. Frommer; Darren M. Simon

(57) ABSTRACT

Synchronous information indicates a difference ($\beta$) between a PCR value E and a counter value N (=3240000), if the third PCR packet is assumed to arrive at a transmitting apparatus 201 at the time (time t1) the count value N becomes 3240000, on the basis of a difference ($\alpha$) between the PCR value E3 and the count value N3, both generated while as many clocks as (count value N3—reference clock value B) are being counted. Hence, the delay fluctuation generated on a network can be eliminated.

8 Claims, 29 Drawing Sheets

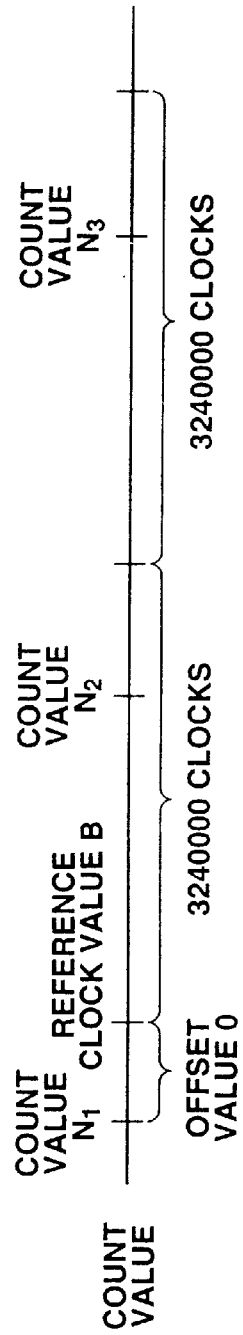
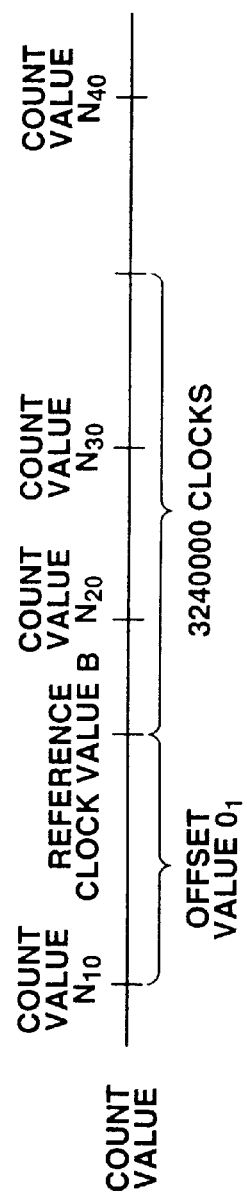
FIG.20(A)
FIG.20(B)

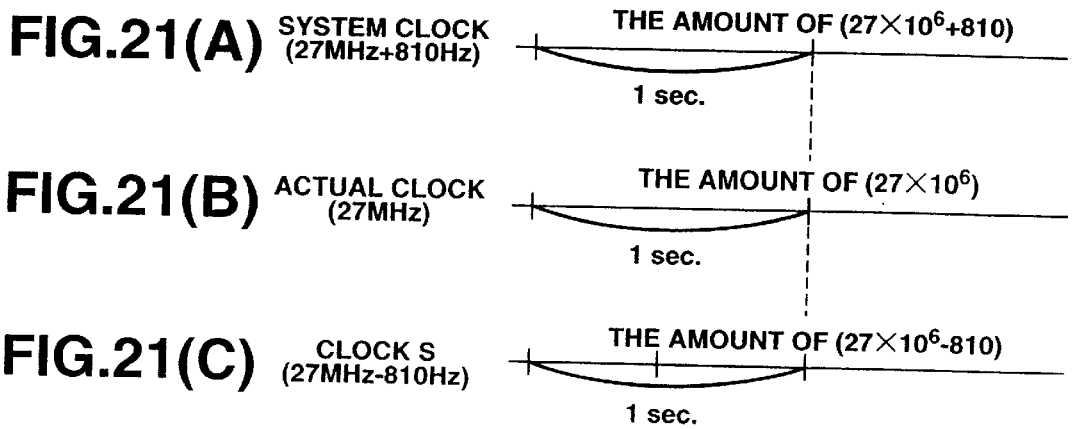
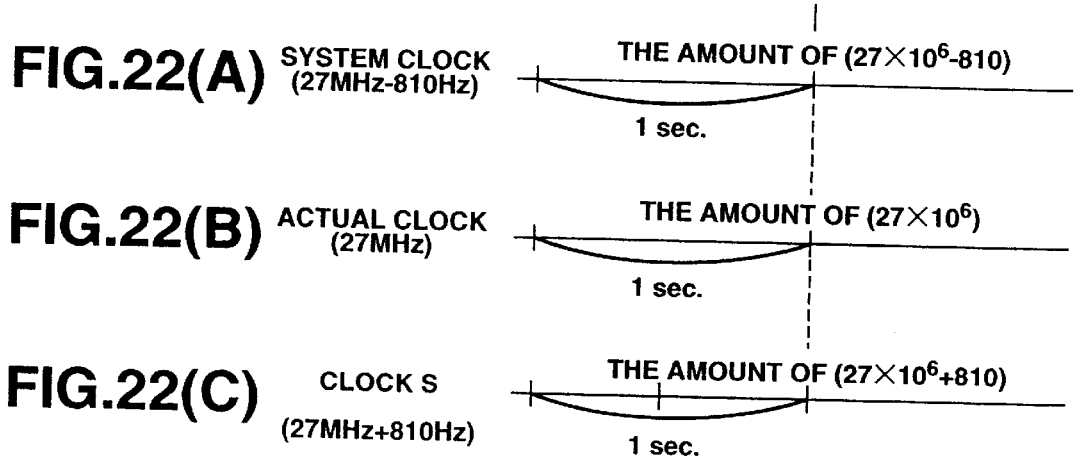

| VALUE OF SYNCHRONOUS INFORMATION | MEANING | VALUE OF SYNCHRONOUS BYTE |
|---|---|---|
| −128 | WITHOUT SYNCHRONOUS INFORMATION | 47h |
| −127 | ERROR OCCURRENCE | 48h |
| −126 | RESERVED | 49h |
| −125 TO 125 | SYNCHRONOUS INFORMATION | 4Ah TO 44h |
| 126 | RESERVED | 45h |
| 127 | RESERVED | 46h |

FIG.23

COMMUNICATION APPARATUS, COMMUNICATION METHOD AND STORAGE MEDIUM

This is a continuation of copending International Application PCT/JP00/02493 having an international filing date of Apr. 17, 2000.

TECHNICAL FIELD

This invention relates to a communication apparatus, a communication method and a storage medium. More particularly, it relates to a communication apparatus, a communication method and a storage medium for transmitting and receiving digital audio data and video data, utilizing ATM communication technique.

BACKGROUND ART

FIG. 1 illustrates the structure of a conventional data communication system. The network 3 that connects the encoding side and the decoding side is assumed to be using a satellite as in the transmission method employed in digital CS broadcasting. In other words, it is assumed that the data transmitted via the network 3 is delayed at regular intervals.

The encoder 1 encodes, for example, video data and audio data, as the data to be transmitted, in accordance with the MPEG-2 system and outputs the encoded data to the system encoder 2. The system encoder 2 encodes the input video and audio data, generating a transport stream packet. If necessary, the system encoder 2 multiplexes the transport stream packet with another transport stream packet and outputs them onto the network 3.

The system encoder 2 incorporates PCR (Program Clock Reference), i.e., a time stamp, into the header of the transport stream packet generated, as is shown in FIG. 2. (Hereinafter, the transport stream packet into which the PCR has been incorporated shall be called "PCR packet".) The PCR is a count value of the system clock C1 (a clock having frequency of 27 MHz in the case of the MPEG-2 system) which has been counted at the timing of outputting the transport stream from the encoding side. The PCR is incorporated into the transport stream so that at least one may be output within 0.1 second from the encoding side in accordance with the MPEG-2 system standards.

Referring back to FIG. 1, the transport stream packet (including the PCR packet) is transmitted through the network 3, reaches the decoding side and input to the system decoder 4 provided in the decoding side. The data transmitted via the network 3 is delayed by a predetermined time. The PCR (PCR packet) therefore reaches the decoding side in the same interval as the interval at which it has been transmitted from the encoding side. (The difference should fall within +/−500 ns.)

The system decoder 4 de-packetizes the input transport stream packet, generating an audio stream or a video stream, which is output to the decoder 5. The system decoder 4 extracts the PCR from the PCR packet as is illustrated in FIG. 2. The decoder 4 compares the PCR with the count value of the system clock C2 (a clock signal having frequency of 27 MHz) in the decoding side, which has been obtained at the timing of extracting the PCR. The decoder 4 adjusts the speed of the system clock C2 based on the results of comparison, and supplies the system clock C2 to the decoder 5.

The decoder 5 decodes the audio data or video data supplied from the system decoder 4, in synchronism with the system clock C2 supplied from the system decoder 4.

How the system clock C2 is generated (adjusted) in the decoding side will be now be described, with reference to FIGS. 3 and 4. The system decoder 4 has the structure shown in FIG. 3. The transport stream packet supplied to the system decoder 4 is supplied to the system decoder 11 and time stamp extracting circuit 12 of the system decoder 4.

As shown in FIG. 2, the time stamp extracting circuit 12 extracts the PCR incorporated in the PCR packet and supplies the PCR to a PLL circuit 13. The PLL circuit 13 has, for example, the structure shown in FIG. 4. It has a subtracter 21, to which the PCR extracted by the time stamp extracting circuit is input. Also input to the subtracter 21 is the count value of a counter 24 when the PCR is input. The count value is a count of the number of clock pulses output from a VCO (Voltage-Controlled Oscillator) 23. The subtracter 21 finds the difference between the PCR and the count value, which have been supplied from the time stamp extracting circuit 12 and the counter 24, respectively. A low-pass filter (hereinafter referred to as "LPF") 22 smoothes, with time, the result of the subtraction supplied from the subtracter 21 and outputs the same to the VCO 23. The VCO 23, which also functions as a D/A converter, then converts the digital signal input from the LPF 22 to an analog signal. Using the analog signal as a control voltage, the VCO generates a system clock C2 having a frequency corresponding to the control voltage. The VCO 23 then outputs the system clock to the counter 24 and the decoder 5.

The counter 24 counts the pulses of the system clock C2 supplied from the VCO 23 acting as a D/A converter. The count value of the counter 24 is supplied to the substracter 21 as the signal that indicates the frequency and phase that the system clock C2 has at this time. That is, the PLL circuit 13 adjust the speed of the system clock C2 so that the difference between the PCR value incorporated in the transport stream packet and the count value of the system clock C2, obtained when the PCR was extracted (when the PCR packet reaches the decoding side) may be eliminated. As a result, the system clock C2 in the decoding side becomes synchronous with the system clock C1 in the encoding side.

With reference to FIG. 3 again, the system decoder 11 de-packetizes the input transport stream packet, generating an audio stream and a video stream. The audio stream and video stream are output to the decoder 5.

A satellite may be used as the network 3 as in the transmission method employed in satellite broadcasting. In this case, a fixed delay is added to the transport stream packet transmitted from the encoding side. That is, the transport stream packet transmitted from the encoding side reaches the decoding side, earlier or later by a specific time. Since the specific time is constant, the interval at which the transport stream packet (including the PCR packet) reaches the decoding side is the same as the interval at which it is output from the encoding side. Thus, the system clock C2 in the decoding side is generated, synchronous with the system clock C1 in the encoding side, by the method explained with reference to FIGS. 3 and 4.

If the network 3 is an ATM (Asynchronous Transfer Mode) network, however, the transport stream packet transmitted from the encoding side is delayed, not at a constant interval but at an interval fluctuating in the range of 1 ms to 2 ms (hereinafter referred to as "delay fluctuation"). The delay fluctuation cannot be absorbed in the data transmission system described above. After all, the delay greatly exceeds the MPEG-2 standard range of +/−500 ns. In consequence, the data cannot be reproduced adequately.

A synchronization method, such as adaptive clock method, has been proposed. In the method, the delay fluctuation is first attenuated to some extent and a system clock is then generated.

FIG. 5 shows an example of the adaptive clock circuit 51 which is provided in the decoding side and which uses the adaptive clock method. It is assumed here that delay fluctuation exists in the data transmitted via a network 50.

The data with delay fluctuation, transmitted via the network 50, is input to the FIFO 52 incorporated in the adaptive clock circuit 51. The FIFO 52 holes the data for some time and outputs the data in response to a read clock supplied from a control circuit 53. The FIFO 52 outputs a signal to an LPF 54. The signal represents the data occupation ratio of the FIFO 52. The LPF 54 smoothes the data occupation ratio and outputs the same to the control circuit 53.

The control circuit 53 controls the speed of a read clock to be output to the FIFO 52, so that the data supplied from the LPF 54 (i.e., the smoothed data occupation ratio of the FIFO 52) may have a prescribed value. That is, the clock controlled by the control circuit 53 is used as system clock in the decoding side.

In the adaptive clock system, the system clock for the decoding side is generated from the received data only. The apparatus can therefore be simple in structure. In this example, however, the jitter component is shaped in analog fashion. Inevitably, the jitter component remains for a long time, and the delay fluctuation cannot be adequately absorbed.

A data communication system has been proposed, which comprises a transmission apparatus 61 shown in FIG. 6 and a receiving apparatus 62 shown in FIG. 7. The system is designed for use in, for example, television broadcast stations or program producing companies, to transmit a plurality of programs synchronized with the clocks used in the stations and companies.

As shown in FIG. 6, the transmission apparatus 61 has a PLL circuit 71 and N synchronous data generating circuits 72-1 to 72-N (hereinafter, collectively referred to as "synchronous data generating section 72" so far as they need not be distinguished from one another, and other components will be similarly referred to). The PLL circuit 71 receives an 8 HKz clock, i.e., the network clock for the network 63. The PLL circuit 71 has a phase comparator 91, the structure of which is illustrated in FIG. 8. The phase comparator 91 has a VCO 92 and a frequency divider 93. The VCO 92 generates a 27 MHz signal having a predetermined phase. The signal is supplied to the frequency divider 93 and to the synchronous data generating circuits 72-1 to 72-N.

The frequency divider 93 divides the frequency of the 27 MHz clock input from the VCO 92 with a division ratio of 1/3375, generating an 8 KHz clock. The 8 KHz clock is output to a phase comparator 94. The phase comparator 94 compares the 8 KHz clock and the 8 KHz clock supplied from the network 63 and frequency divider 93, respectively, in terms of phase, and outputs the result of the comparison to the VCO 92.

The synchronous data generating circuit 72-1 comprises a PLL circuit 81, a latch circuit 82, a clock 83 and the like. The PLL circuit 81 receives, for example, the time stamp contained in the data generated in synchronism with a prescribed clock. The PLL circuit 81 is the same in structure as the PLL circuit 13 shown in FIG. 4. That is, the PLL circuit 81 generates a prescribed clock from the input time stamp and outputs the clock to the latch circuit 82.

The latch circuit 82 performs a latching process in accordance with the clock supplied from the PLL circuit 81 and the clock signal supplied from the clock 83. The data reproduced from the result of the latching process is synchronous data, which is incorporated into a predetermined transport stream packet.

The synchronous data generating circuits 72-2 to 72-N have the same structure as the synchronous data generating circuit 72-1. Their structure will not be illustrated or described in detail. They receive the time stamps contained in data items generated in synchronism with different clocks, and generate data items synchronous with the clocks, respectively.

As shown in FIG. 7, the receiving apparatus 62 comprises a PLL circuit 101 and N system clock regenerating circuits 102-1 to 102-N. The PLL circuit 101 receives an 8 KHz clock, which is the network clock of the network 63. Like the PLL circuit 71 of the transmission apparatus 61, the PLL circuit 101 generates a 27 MHz clock that corresponds to the 8 KHz clock input. The 27 MHz clock is output to the system clock regenerating circuits 102-1 to 102-N.

The system clock regenerating circuit 102-1 comprises a clock 110, a PLL circuit 111 and the like. The clock 110 of the system clock regenerating circuit 102-1 receives the clock supplied from the PLL circuit O1. The clock 110 divides the frequency of the clock with a division ratio of 1/27000000, generating a clock signal. The clock signal is output to the PLL circuit 111. The PLL circuit 111 receives the clock from the clock 110 and the synchronous data generated by the synchronous data generating circuit 72-1 of the transmission apparatus 61. The PLL circuit 111 regenerates the system clock from the clock and synchronous data that have been input to it.

The system clock regenerating circuits 102-2 to 102-N have the same structure as the system clock regenerating circuit 102-1. Therefore, they will not be shown in detail. They regenerate system clocks from the synchronous data items supplied from the corresponding synchronous data generating circuits 72. The system clocks, thus regenerated, are synchronous with the clocks used to encode the respective data items. Data can therefore be appropriately reproduced by decoding the data by using the respective clocks.

The data transmission system described above, however, needs to have a synchronous data generating circuit 72 and a system clock regenerating circuit 102 for each of the clocks which are used to encode the input data. The apparatus would inevitably be complicated and large.

DISCLOSURE OF THE INVENTION

In the present invention, a time stamp added to input data is read. The count value of the network clock is held at the time the data is input. A reference clock value is determined from the time stamp read and the count value of the network clock at the time the data including the time stamp is input. An error of the time stamp of the data when the time stamp is isolated from the reference clock value by a fixed clock is calculated from the distance between the reference clock value and the time stamp read and the distance that exists between the reference clock value and the count value of the network clock when the data held and containing the time stamp is input. The error calculated by the calculating means is written. The data containing the time stamp that includes the error is transmitted to the receiving apparatus.

That is, a communication apparatus according to the present invention is characterized by comprising: reading means for reading a time stamp added to input data; holding means for holding a count value of the network clock at the time the data is input; determining means for determining a reference clock value from the time stamp read by the reading means and the count value of the network clock, held by the holding means, at the time the data including the time stamp is input; calculating means for calculating an error of the time stamp of the data when the time stamp is isolated from the reference clock value by a fixed clock, from the distance between the reference clock value and the time stamp read by the reading means and the distance that exists between the reference clock value and the count value of the network clock when the data held by the holding means and containing the time stamp is input; writing means for writing the error calculated by the calculating means; and transmitting means for transmitting, to the receiving apparatus, the data containing the time stamp that includes the error written by the writing means.

A communication method according to the invention is characterized by comprising: a reading step of reading a time stamp added to input data; a holding step of holding a count value of the network clock at the time the data is input; a determining step of determining a reference clock value from the time stamp read by the reading means and the count value of the network clock, held by the holding means, at the time the data including the time stamp is input; a calculating step of calculating an error of the time stamp of the data when the time stamp is isolated from the reference clock value by a fixed clock, from the distance between the reference clock value and the time stamp read by the reading means and the distance that exists between the reference clock value and the count value of the network clock when the data held by the holding means and containing the time stamp is input; a writing step of writing the error calculated by the calculating means; and a transmitting step of transmitting, to the receiving apparatus, the data containing the time stamp that includes the error written by the writing means.

A recording medium according to the invention records a program which describes: a reading step of reading a time stamp added to input data; a holding step of holding a count value of the network clock at the time the data is input; a determining step of determining a reference clock value from the time stamp read by the reading means and the count value of the network clock, held by the holding means, at the time the data including the time stamp is input; a calculating step of calculating an error of the time stamp of the data when the time stamp is isolated from the reference clock value by a fixed clock, from the distance between the reference clock value and the time stamp read by the reading means and the distance that exists between the reference clock value and the count value of the network clock when the data held by the holding means and containing the time stamp is input; a writing step of writing the error calculated by the calculating means; and a transmitting step of transmitting, to the receiving apparatus, the data containing the time stamp that includes the error written by the writing means.

According to this invention, a time stamp added to input data is read. Error information contained in the input data and corresponding to a predetermined fixed clock is read. A count value of the network clock is held at the time the data is input. A reference clock value is determined from the time stamp read, and the count value of the network clock, held by the holding means, at the time the data held and including the time stamp is input. An offset value is determined from the time stamp read and from the count value of the network clock held and acquired at the time the data containing the time stamp is input. The time stamp is updated on the basis of the time stamp read, the error information written to the data containing the time stamp, the reference clock value determined, the offset value determined and the fixed clock.

That is, a communication apparatus according to the present invention is characterized by comprising: first reading means for reading a time stamp added to input data; second reading means for reading error information contained in the input data and corresponding to a predetermined fixed clock; holding means for holding a count value of the network clock at the time the data is input; first determining means for determining a reference clock value from the time stamp read by the first reading means and the count value of the network clock, held by the holding means, at the time the data held by the holding means and including the time stamp is input; second determining means for determining an offset value from the time stamp read by the first reading means and from the count value of the network clock held by the holding means and acquired at the time the data containing the time stamp is input; and updating means for updating the time stamp on the basis of the time stamp read by the first reading means, the error information written to the data containing the time stamp, the reference clock value determined by the first determining means, the offset value determined by the second determining mans and the fixed clock.

A communication method according to the invention is characterized by comprising: a first reading step of reading a time stamp added to input data; a second reading step of reading error information contained in the input data and corresponding to a predetermined fixed clock; a holding step of holding a count value of the network clock at the time the data is input; a first determining step of determining a reference clock value from the time stamp read by the first reading means and the count value of the network clock, held by the holding means, at the time the data held by the holding means and including the time stamp is input; a second determining step of determining an offset value from the time stamp read by the first reading means and from the count value of the network clock held by the holding means and acquired at the time the data containing the time stamp is input; and an updating step of updating the time stamp on the basis of the time stamp read by the first reading means, the error information written to the data containing the time stamp, the reference clock value determined by the first determining means, the offset value determined by the second determining mans and the fixed clock.

A recording medium according to the invention records a program which describes: a first reading step of reading a time stamp added to input data; a second reading step of reading error information contained in the input data and corresponding to a predetermined fixed clock; a holding step of holding a count value of the network clock at the time the data is input; a first determining step of determining a reference clock value from the time stamp read by the first reading means and the count value of the network clock, held by the holding means, at the time the data held by the holding means and including the time stamp is input; a second determining step of determining an offset value from the time stamp read by the first reading means and from the count value of the network clock held by the holding means and acquired at the time the data containing the time stamp is input; and an updating step of updating the time stamp on the basis of the time stamp read by the first reading means, the error information written to the data containing the time stamp, the reference clock value determined by the first determining means, the offset value determined by the second determining mans and the fixed clock.

BRIEF DESCRIPTION OF THE DRAWINGS

FIG. 20(A) and FIG. 20(B) are another timing chart explaining the process of generating the synchronizing data;

FIG. 21(A), FIG. 21(B) and FIG. 21(C) are a diagram representing the amounts of synchronizing data;

FIG. 22(A), FIG. 22(B) and FIG. 22(C) are another diagram representing the amount of synchronizing data;

FIG. 23 is a diagram the meaning of the value of each synchronizing data item;

BEST MODE FOR CARRYING OUT THE INVENTION

The best mode for carrying out the present invention will be described, with reference to the accompanying drawings.

Figure 9:
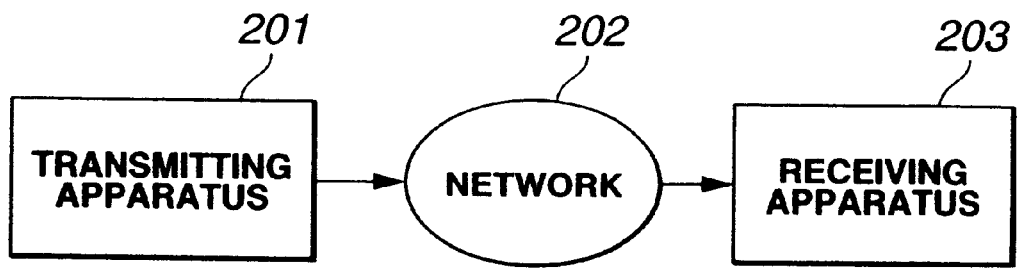
FIG. 9 is a diagram depicting a data transmission system to which this invention is applied.

FIG. 9 shows the structure of a data transmission system according to this invention. In the system, an MPEG transport stream conforming to the MPEG-2 system is transmitted and received through a network 202 that is an ATM network. Delay fluctuation inevitably takes place in the data being transmitted through the network 202.

The data transmission system has a transmitting apparatus 201. The apparatus 201 receives an MPEG transport stream packet in which a plurality of programs encoded are multiplexed. The MPEG transport stream packet contains PCR packets so that PCRs may arrive at intervals of at least 0.1 second, at the receiving apparatus 203 incorporated in the data transmission system.

Figure 10:
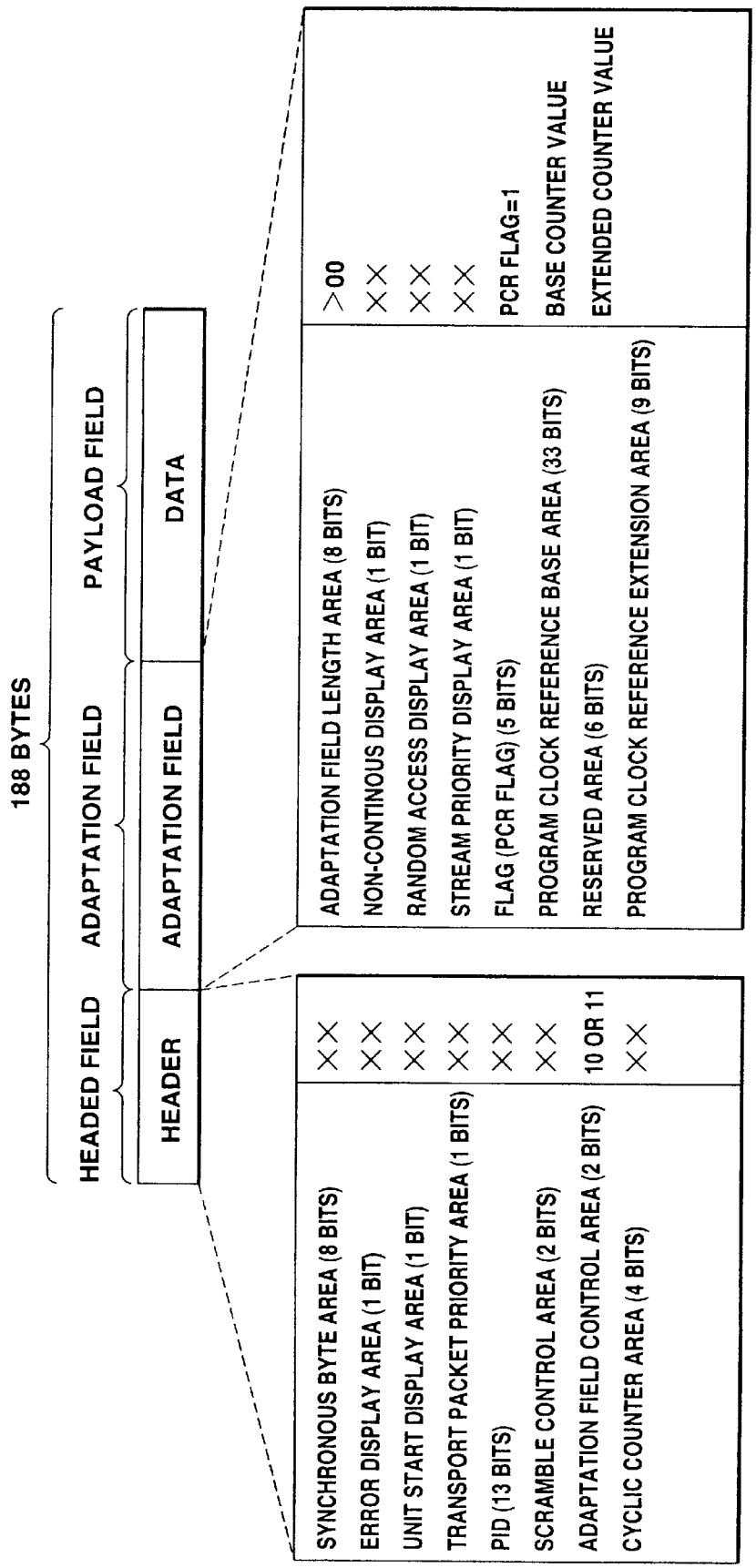
FIG. 10 is a diagram explaining the data format of an MPEG transport stream packet.

As shown in FIG. 10, the MPEG transport stream packet is a fixed 188-byte packet that consists of a header section field, an adaptation field, a payload field and the like. The header field includes a synchronous byte area (8 bits), an error display area (1 bit), a unit start display area (1 bit), a transport packet priority area (1 bit), a PID (Packet Identification) area (13 bits), a scramble control area (2 bits), an adaptation field control area (2 bits), and a cyclic counter area (4 bits). The synchronous byte is defined as 47 h.

The adaptation field includes an adaptation field length area (8 bits), a non-continuous display area (1 bit), a random access display area (1 bit), a stream priority display area (1 bit), a flag area (5 bits), a program clock reference base area (33 bits), a reserve area (6 bits), and a program clock reference extension area (9 bits). There are five kinds of flags, including a PCR flag (1 bit).

The payload field includes data.

The MPEG transport stream packet has the data format described above. As shown in FIG. 10, however, the MPEG transport stream packet is defined as the PCR packet if the adaptation field control area of the header field is defined as "10" or "11," if the adaptation field length area of the adaptation field has a value other than "00h" and if "1" is set to the PCR flag (such data setting will be hereinafter called "PCR packet condition"). The combination of the value in the program clock reference base area and the value in the program-clock-reference extension area of the adaptation field indicates a PCR value.

The values of 0 to 299 are sequentially set (counted) to the program clock reference base area. Only one of the program clock reference extension area is incremented at the time the value of the program clock reference base area is reset to 0 from 299. That is, the time of 24 hours can be counted in units of 27 MHz system clocks in the MPEG-2 system, in the form of total 42 bits of the program clock reference base area and program clock reference extension area.

As shown in FIG. 9, the MPEG transport stream packet (including the PCR packet) input to the transmitting apparatus 201 is converted, in the apparatus 201, to an ATM cell. The ATM cell is transmitted to the network 202. Nonetheless, the predetermined synchronous data (to be described later) generated from the PCR value is stored into the PCR packet.

The ATM cell transmitted via the network 202 reaches the receiving apparatus 203 and is converted to an MPEG transport stream. The PCR value contained in the PCR packet is corrected in accordance with the predetermined synchronous data stored in the PCR packet. The MPEG transport stream packet containing the PCR packet, whose PCR value has been corrected, is supplied to a decoder (not shown) and then decoded by the decoder.

Figure 11:
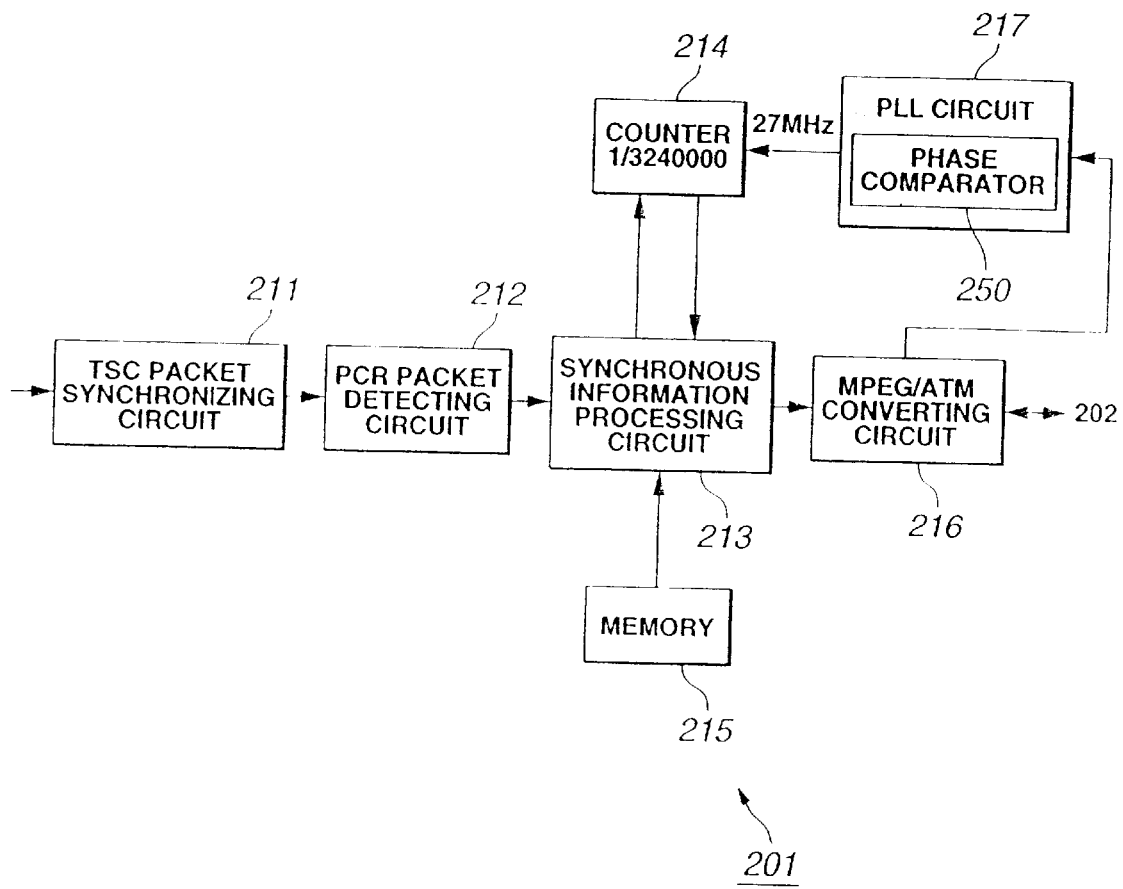
FIG. 11 is a diagram illustrating the structure of the transmission apparatus incorporated in the data transmission system.

FIG. 11 illustrates the structure of the transmitting apparatus 201. The apparatus 201 has an MPEG transport stream packet synchronizing circuit 211 (hereinafter referred to as "TS packet synchronizing circuit"). The circuit 211 receives the MPEG transport stream packet supplied to the transmitting apparatus 201. The TS packet synchronizing circuit 211 detects the head of the MPEG transport stream packet input to it and sets up the synchronization of the MPEG transport stream packet Then, the circuit 211 outputs MPEG transport stream packet to a PCR packet detecting circuit 212.

The PCR packet detecting circuit 212 refers to the header field and adaptation field of the MPEG transport stream packet (i.e., an MPEG transport stream packed that is frame-synchronized) input in TS packet synchronizing circuit 211, to determine whether the PCR packet condition is set to the MPEG transport stream packet. If it is determined that the PCR packet condition is set to the MPEG transport stream packet, that is, if the MPEG transport stream packet is a PCR packet, the circuit 212 outputs a signal to a synchronous information processing circuit 213. The signal (hereinafter referred to as PCR packet detecting signal) indicates the PCR packet condition.

The synchronous information processing circuit 212 outputs the MPEG transport stream packet to the synchronous information processing circuit 213, without performing whatever process on the MPEG transport stream packet.

The synchronous information processing circuit 213 receives the MPEG transport stream packet and PCR packet detecting signal from the PCR packet detecting circuit 212 and a count value from a counter 214.

The synchronous information processing circuit 213 reads a PCR from the MPEG transport stream packet (PCR packet) designated by the PCR packet detecting signal supplied from the PCR packet detecting circuit 212. The circuit 213 generates synchronous data from the PCR thus read. The synchronous information processing circuit 213 writes the synchronous data into the PCR packet, which is output to an MPEG/ATM converting circuit 216.

A memory 215 is provided, which stores the data that is supplied from the synchronous information processing circuit 213 and that is necessary in calculating the synchronous data. In this case, the synchronous information processing circuit 213 calculates synchronous data for each program (i.e., PID set in the MPEG transport stream packet). Hence, the memory 215 stores data items supplied from the synchronous information processing circuit 213 for the respective programs.

The MPEG/ATM converting circuit 216 converts the MPEG transport stream packet to an ATM cell, which is transmitted to the network 202. The MPEG/ATM converting circuit 216 also receives the ATM cells sequentially transmitted from the network 202. It generates an 8 KHz clock that is synchronous with the network clock from the ATM cell it has received. This clock is output to a PLL circuit 217.

Figure 6:
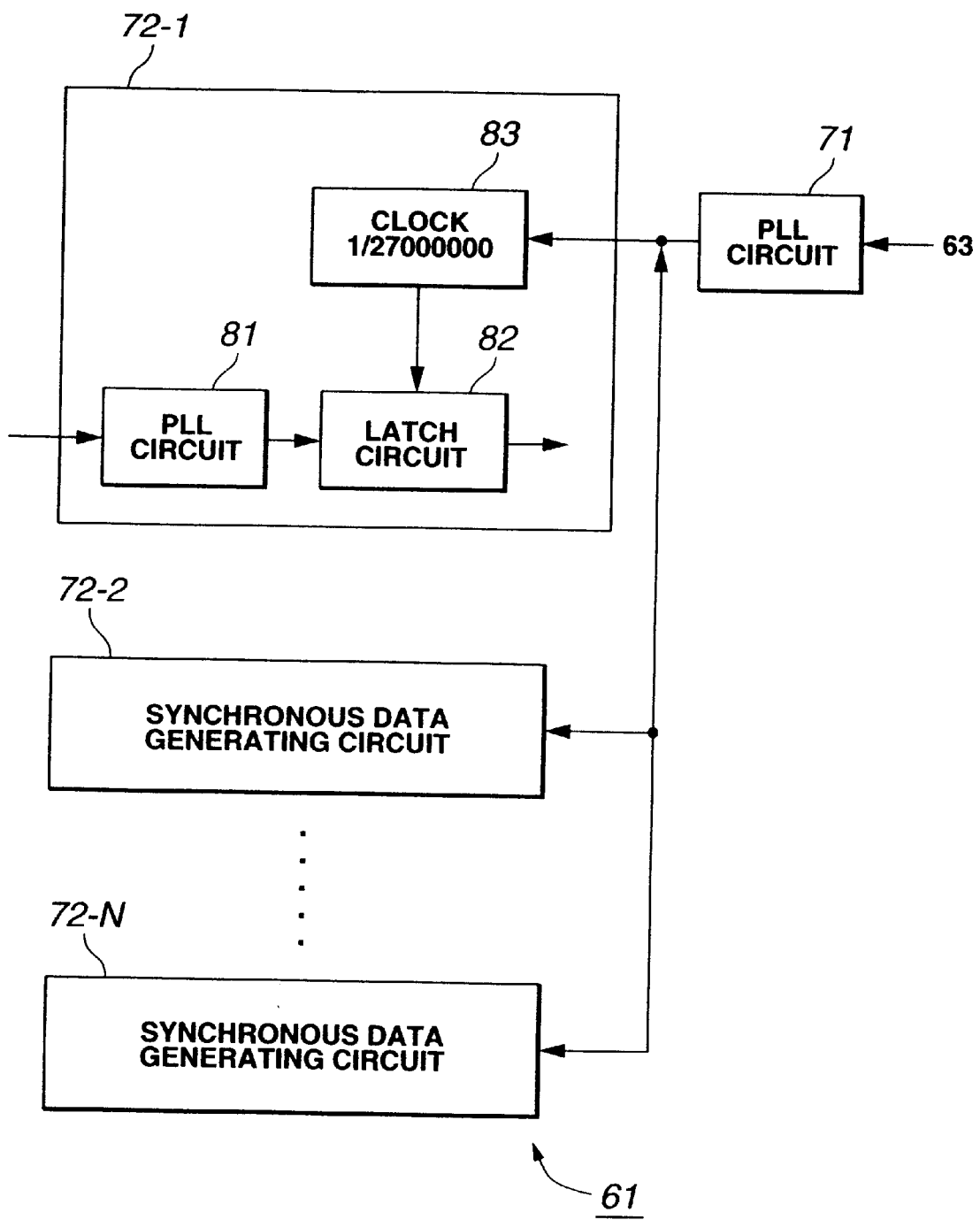
FIG. 6 is a block diagram showing the structure of a transmitting apparatus.
Figure 7:
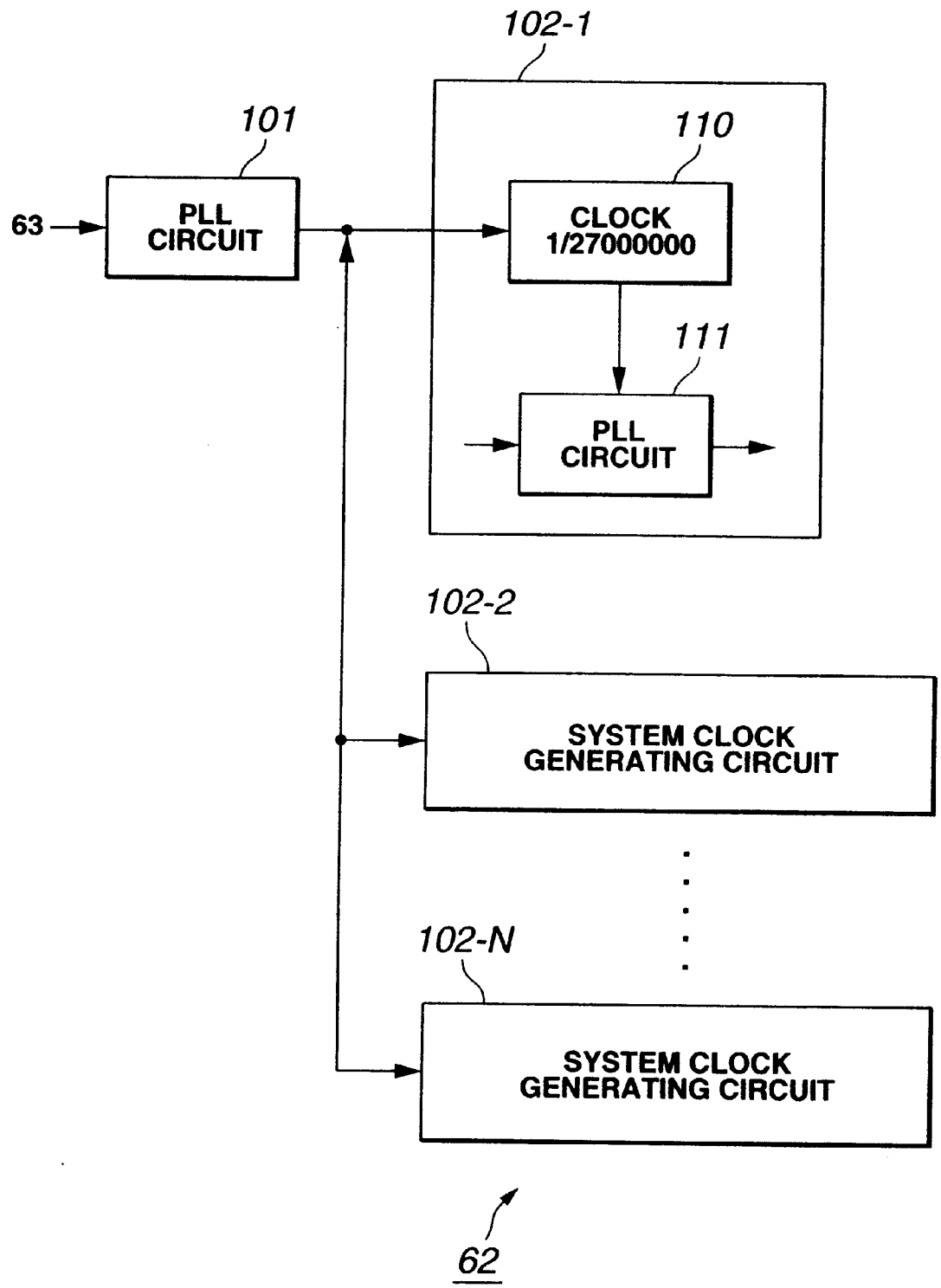
FIG. 7 is a block diagram illustrating the structure of a receiving apparatus.
Figure 8:
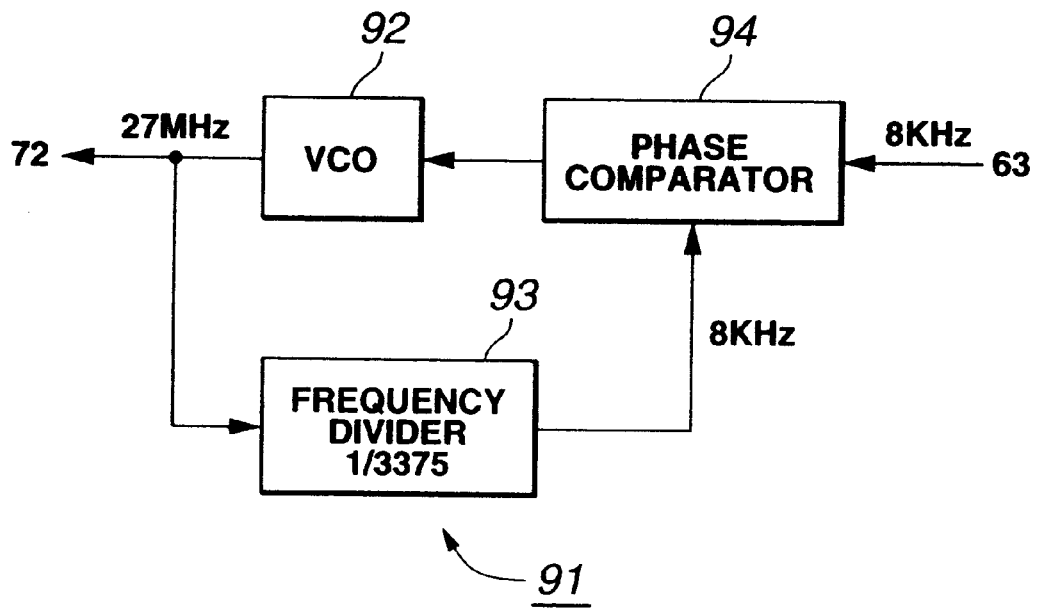
FIG. 8 is a block diagram showing the structure of a phase comparator.
Figure 12:
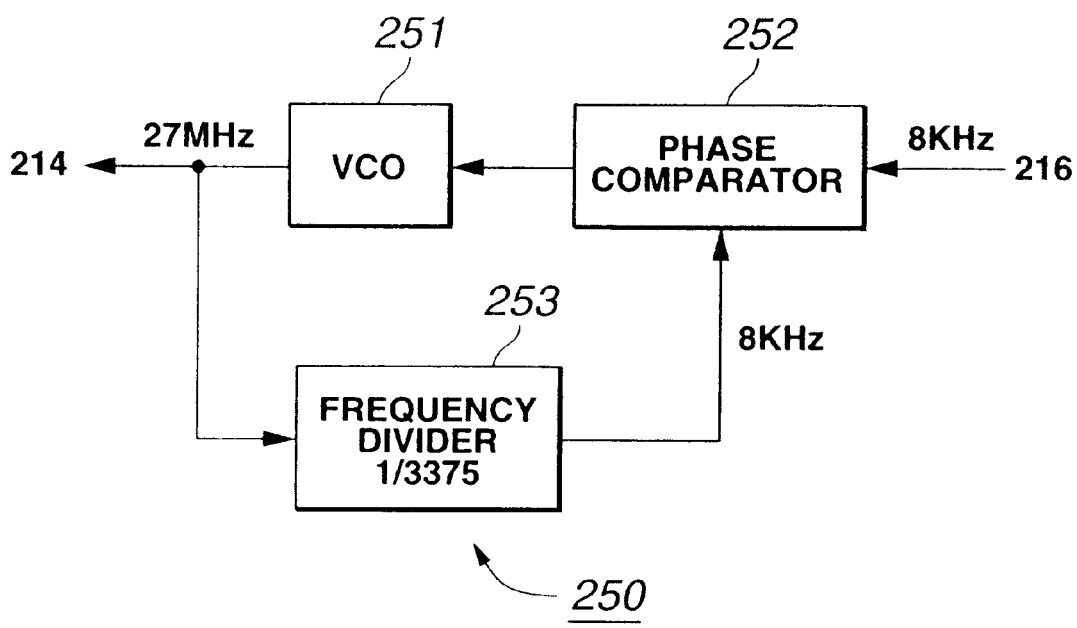
FIG. 12 is a diagram showing the structure of a phase comparator.

Like the PLL circuit 71 shown in FIG. 6, the PLL circuit 217 has a phase comparator 250 of such a structure as shown in FIG. 12. The phase comparator 250 comprises a VCO 251, a phase comparator 252, and a frequency divider 253.

The VCO 251 generates a 27 MHz clock of a predetermined phase, from the signal supplied from the phase comparator 252. The 27 MHz clock is output to the counter 214 and the frequency divider 253. The frequency divider 253 divides the frequency of the 27 MHz clock input from the VCO 251 with a division ratio of 1/3375, thus generating an 8 KHz clock. The 8 KHz clock is output to the phase comparator 252. The phase comparator 252 compares the 8 KHz clock supplied from the MPEG/ATM converting circuit 216 with the 8 KHz clock supplied from the frequency divider 253, in terms of phase. The result of the comparison is output to the VCO 251. Thus, the 27 MHz clock output to the counter 214 has its phase adjusted, to be synchronous with the network clock of the network 202.

As shown in FIG. 11, the counter 214 divides the frequency of the 27 MHz clock supplied from the PLL circuit 217 with a division ratio of 1/3240000 and counts the clocks generated by this frequency division. The resultant count value N is output to the synchronous information processing circuit 213. That is, the counter 214 counts clocks that are synchronized with the clock of the network 202.

How the TS packet synchronizing circuit 211 provided in the transmitting apparatus 201 operates will be explained, with reference to the flowchart of FIG. 13.

In Step S1, the TS packet synchronizing circuit 211 reads the data of the input MPEG transport stream packet input, byte by byte. The circuit 211 then waits or until it is determined that the value becomes equal to the synchronization byte. If the value of a byte read is found to be 47 h, the operation goes to Step S2, in which the TS packet synchronizing circuit 211 sets the value of a counter i that has counted the number of times 47 h has been repeatedly read.

Next, in Step S3, the TS packet synchronizing circuit 211 reads the data at a position isolated as much as 188 bytes from the position where 37 h has read in Step S1. In Step S4, the circuit 211 determines whether this data is 47 h or not. If the data read in Step S3 is found not to be 47 h, the operation returns to Step S1. The circuit 211 performs the subsequent steps. If the data read in Step S4 is found to be 47 h, the TS packet synchronizing circuit 211 goes to Step S5.

In Step S5, the TS packet synchronizing circuit 211 determines whether the value of the counter i is 5 or not. If the value is found not to be 5, the operation goes to Step S6. In Step S6, the TS packet synchronizing circuit 211 increments the value of the counter i by one. The operation then returns to Step S3, and the circuit 211 carries out the subsequent steps. If the value of the counter i is found to be 5 in Step S5, that is, if 47 h has been read continuously five times, each time for 188 bytes, from the data of the input MPEG transport stream packet, the operation goes to Step S7.

In Step S7, the TS packet synchronizing circuit 211 sets 47 h read for the fifth time as the synchronous byte, or as the head data of the MPEG transport stream packet, thereby accomplishing frame synchronization. The data input to the transmitting apparatus 201 before the frame synchronization is achieved is not supplied to the PCR packet detecting circuit 212 and is discarded.

This is how the frame synchronization is established.

Next, in Step S8, the PCR packet detecting circuit 211 sets the value of the counter i to 1. The operation goes to Step S9, in which the PCR packet detecting circuit 212 reads the data at a position isolated by 188 bytes from the synchronous byte, i.e. 47 h. In Step S10, the circuit 211 determines whether the data read is 47 h or not.

If it is determined in Step S10 that the data read in Step S9 is not 47 h, the PCR packet detecting circuit 212 goes to Step S11. In Step S11, the circuit 211 determines whether the value of the counter i is 3 or not. If the value is found not to be 3, the operation goes to Step S12, in which the circuit 211 increments the value of the counter i by one. The operation then returns to Step S9, and the subsequent steps are carried out. If the value of the counter i is found to be 3 in Step S11, the operation returns to Step S1, and the subsequent steps are performed. In other words, unless the data read continuously three times in Step S9 is 47 h, it is determined that no frame synchronization has been achieved of the MPEG transport stream packet. In this case, the operation returns to Step S1, and the process for establishing the synchronization is effected from the beginning. The data of 3×188 bytes, which has been input before the process is effected to establish the synchronization and which is considered not synchronized yet is supplied to the PCR packet detecting circuit 212.

If the data read in Step S9 is found to be 47 h in Step S10, the TS packet synchronizing circuit 211 returns to Step S9 and performs the subsequent steps.

Another method of establishing synchronization will be described, with reference to the flowchart of FIG. 14. It is assume here that the TS packet synchronizing circuit 211 incorporates a 47 h counting circuit that consists of 188 memory areas i (=1,2, . . . , 188) as is illustrated in FIG. 15. Note that a value of "0" is set in each memory area of the 47 h counting circuit.

In Step S21, the TS packet synchronizing circuit 211 reads, byte by byte, the MPEG transport stream packet input, and waits until the data 47 h is detected. When data 47 h is detected, the circuit 211 goes to Step S22, in which the value of the counter i is incremented by one. Then, in Step S23, the value in the memory area i (=1) designated by the value of the counter i is incremented by one.

Figure 16:
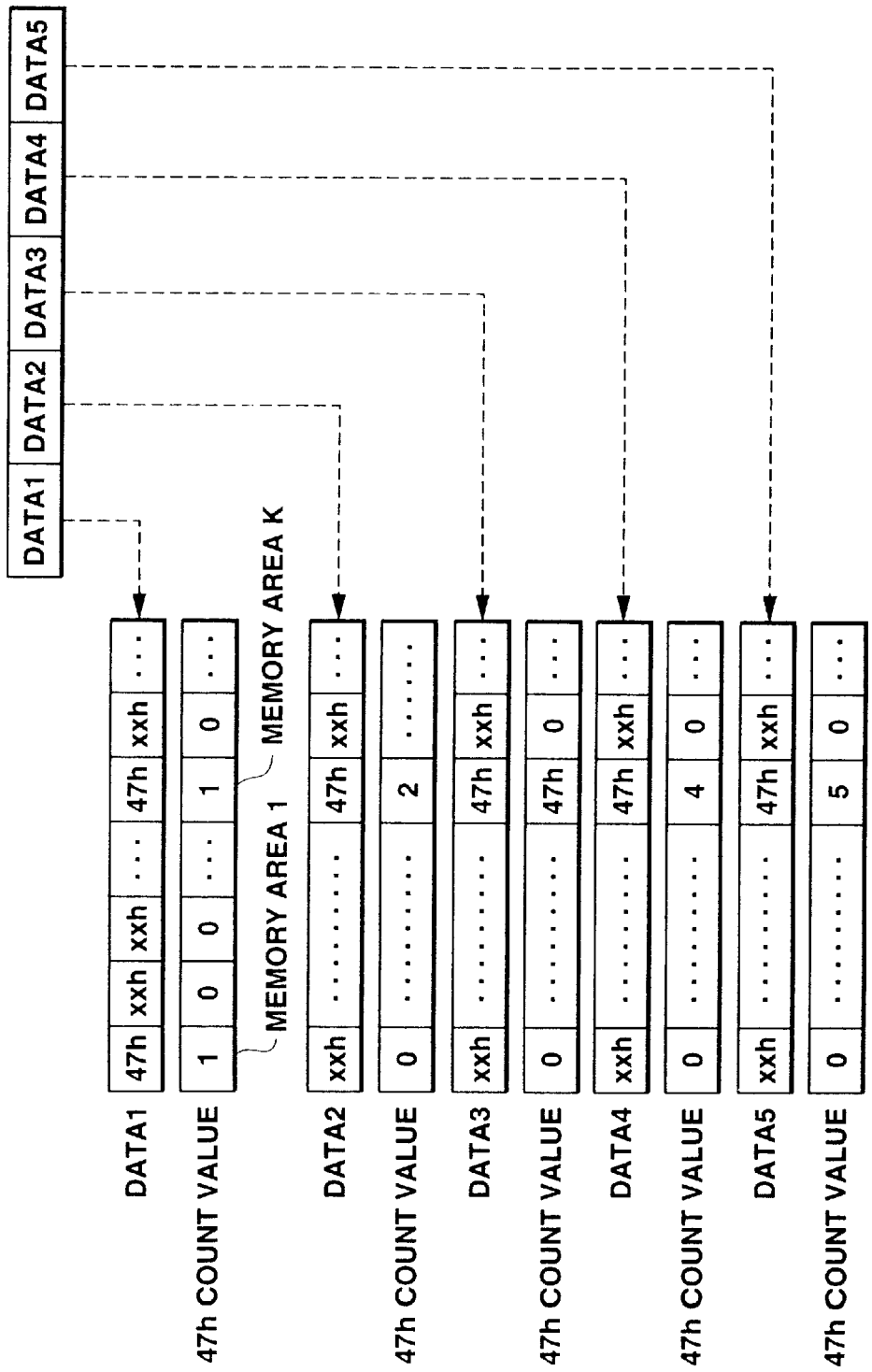
FIG. 16(A) and FIG. 16(B) are diagrams explaining the synchronization setup process.

FIG. 16(B) shows data items 1 to 5, starting at the position where 47 h was detected in Step S21, each consisting of 188 bytes. FIG. 16(A) shows the bytes constituting each data item and the value in the memory area i of the 47 h counting circuit. Value "1" is set in the memory area 1 that corresponds to the head data (47 h) of the data 1. In FIG. 16, "xxh" indicates data other than 47.

Next, in Step S24, the TS packet synchronizing circuit 211 reads one byte next to 47 h detected in Step S21. In Step S25, the circuit 211 increments the value of the counter i by one.

In Step S26, the TS packet synchronizing circuit 211 determines whether the data read in Step S24 is 47 h or not. If the data is found not to be 47 h, the circuit 211 goes to Step S27.

In the data 1 shown in FIGS. 16, the 1-byte data next to 47 h is not 47 h (that is, it is the data "xxh") . Hence, the operation goes to Step S27, in which the TS packet synchronizing circuit 211 set value "0" in the memory area 2.

Next, in Step S28, the TS packet synchronizing circuit 211 determines whether the value of the counter i is 189 or not. If the value is found not to be 189, the operation returns to Step S24 and the subsequent steps are carried out.

If the data read is found to be 47 h in Sep S26, the operation goes to Step S29. In Step S29, the TS packet synchronizing circuit 211 increments the value in the memory area i specified by the value of the counter i. Since the data at a position isolated by k bytes from the head of the data 1 is 4 h, the value in the memory area k is incremented by one.

Next, in Step S30, the TS packet synchronizing circuit 211 determines whether the value in the memory area i, which has been incremented by one in Step S29, is 5 or not. If the value is found not to be 5, the operation returns to Step S28 and the subsequent steps are performed.

If the value of the counter i is found to be 189 in Step S28, the operation returns to Step S22. Thus, the TS packet synchronizing circuit 211 effects the subsequent steps. If the value in the memory area i is found to be 5 in Step S30, the operation goes to Step S31. In Step S31, the TS packet synchronizing circuit 211 sets the data, 47 h, read in Step S24, as a synchronous byte, thereby achieving the frame synchronization of the MPEG transport stream. In the example shown in FIGS. 16, the value in the memory area k is 5 when the data 47 h is read at a position isolated by k bytes from the head of the data 5. Hence, 47 h thus read is used as a synchronous byte, thus establishing the frame synchronization.

Figure 13:
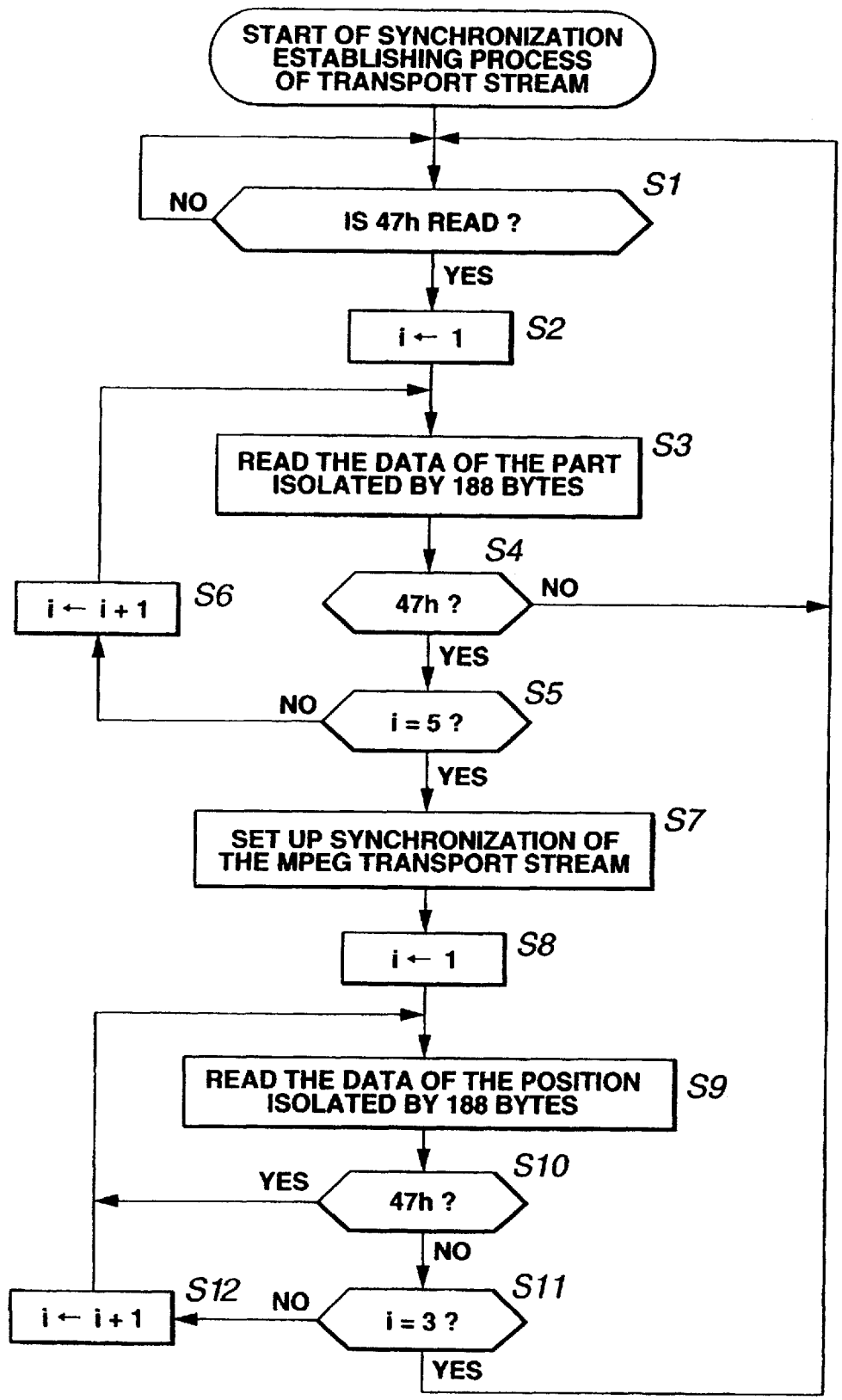
FIG. 13 is a flowchart explaining a synchronization setup process.

Steps S32 and Step S36 are the same as Steps S8 to S12 shown in FIG. 13 and will therefore not be explained.

Figure 17:
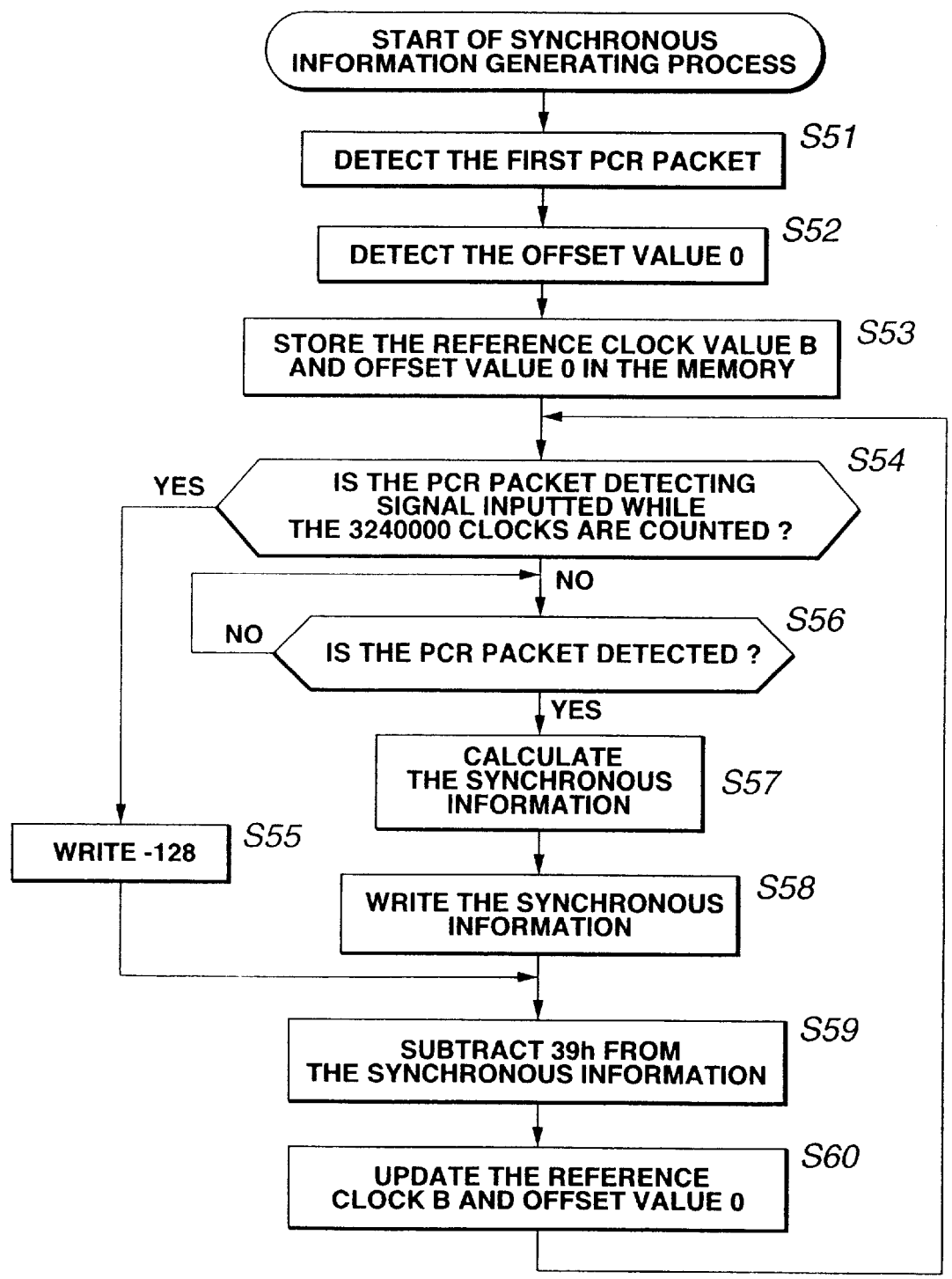
FIG. 17 is a flowchart explaining the process of generating synchronizing data.

The sequence of the process the synchronous information processing circuit 213 performs will be described, with reference to the flowchart of FIG. 17. This process is performed on each PID set in the MPEG transport stream (i.e., a PID for 8192 programs at most). In this instance, the process is performed to calculate synchronous data for one PID.

Figures 18A, 18B, 18C:
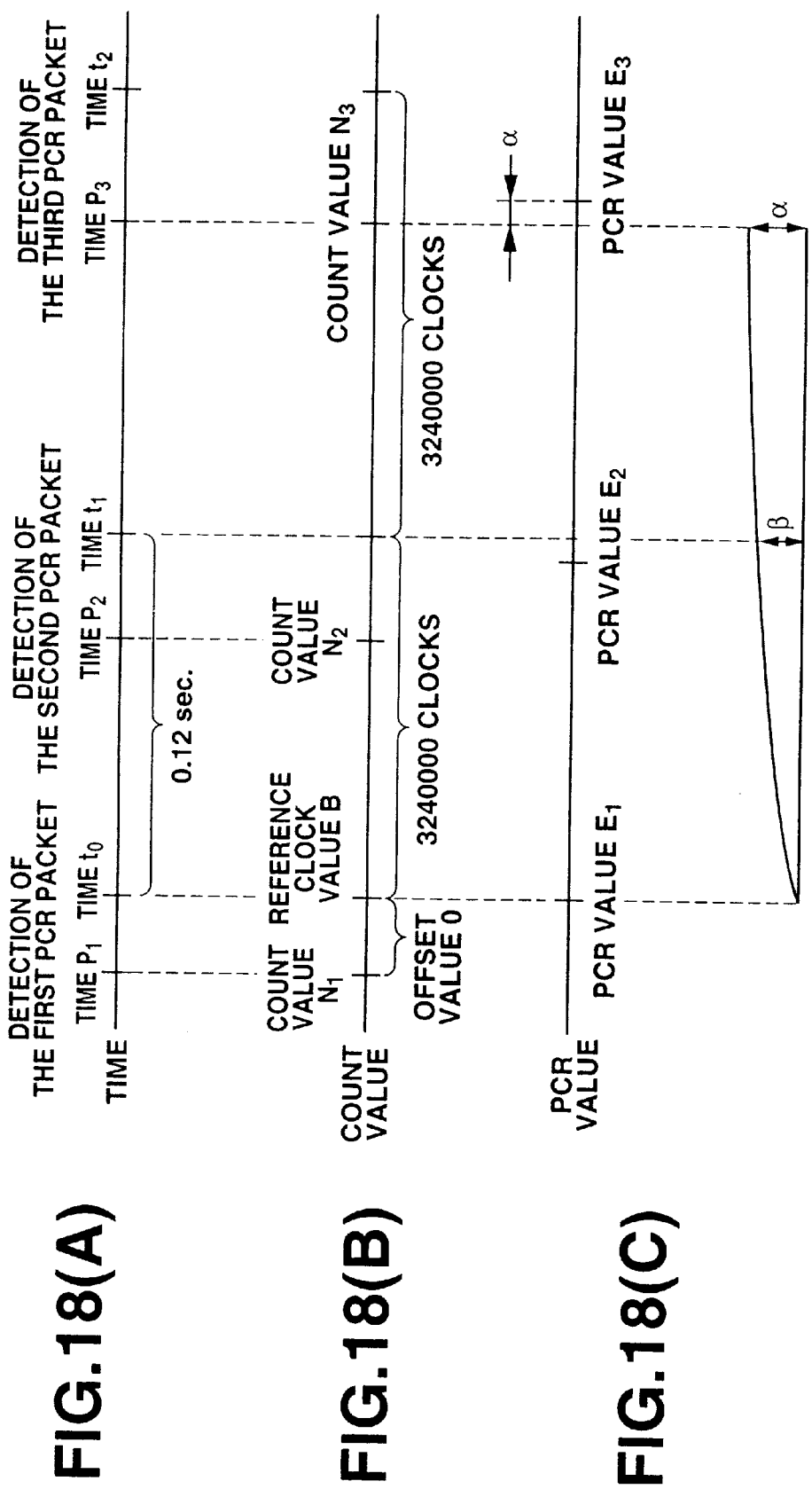
FIG. 18(A), FIG. 18(B) and FIG. 18(C) are a timing chart explaining the process of generating the synchronizing data.

In Step S51, the PCR packet detecting circuit 212 detects the first PCR packet input to the transmitting apparatus 201 at time P1 as shown in FIG. 18(A), while the TS packet synchronizing circuit 211 has established the frame synchronization of the MPEG transport stream packet. The circuit 212 generates a PCR packet detecting signal, which is output to the synchronous information processing circuit 213. The synchronous information processing circuit 213 sets in the memory 215 a flag indicating that the PCR packet has been detected.

Next, in Step S52, the synchronous information processing circuit 213 calculates an offset value O. More precisely, the synchronous information processing circuit 213 first acquires the PCR value E1 (FIG. 18(C)) shown in FIG. 18) of the first PCR packet and defines this value as reference clock value B (FIG. 18(B)). At this time, the synchronous information processing circuit 213 instructs the counter 214 to reset the clock value N when the count value N becomes equal to the reference clock value B (at time t0 shown in FIG. 18 (A)), as is illustrated in FIG. 18(B). Then, the synchronous information processing circuit 213 holds the count value N1 (FIG. 18(B)) supplied from the counter 214 when the PCR packet detecting signal is input in Step S51 as a reference point. The circuit 213 substitutes the count value Ni in the following equation (1), together with the reference clock value B, thereby calculating the offset value O:

$$\text{Offset value } O = \text{PCR value E1 } (=\text{reference clock value B}) - \text{count value N1} \quad (1)$$

In Step S53, the synchronous information processing circuit 213 stores the reference clock value B and the offset value O into the memory 215.

Next, in Step S54, the synchronous information processing circuit 213 determines whether or not the PCR packet detecting signal has been input from the PCR packet detecting circuit 212 before the count value N supplied from the counter 214 becomes 3240000. If the PCR packet detecting signal is found to have been input before that time, the operation goes to Step S55. In this instance, the second PCR packet is detected until 3240000 clock pulses are counted (at time t1, FIG. 18(A)) after the count value N of the counter 214 has been reset (time t0). Therefore, the operation goes to Step S55. If the PCR packet has not been input, the synchronous information processing circuit 213 cancels the flag indicating that the PCR packet has been detected.

In Step S55, the synchronous information processing circuit 213 updates the synchronous byte in the header field of the PCR packet (in this case, the second PCR packet), from 47 h to −128. The reason why so will be explained later.

In Step S54 it may be determined that the PCR packet has not been detected before the count value N of the counter 214 becomes 3240000. If this is the case, the synchronous information processing circuit 213 instructs the counter 214 to reset the count value N at the time the count value N becomes 3240000. Thereafter, the operation goes to Step S56.

In Step S56, the synchronous information processing circuit 213 waits until a PCR packet is detected (that is, until a PCR packet detecting signal is input). In this case, the counter 214 counts 27 MHz clocks divided to 1/3240000 the original frequency. Thus, it takes 0.12 seconds (=3240000/ 27000000) to finish counting 3240000 clocks. In other words, one PCR packet (i.e., the third PCR packet, in this case) is reliably detected until 3240000 clocks are counted (e.g., at time t2 shown in FIG. 18(A)) after the count value N is reset in Step S54 (e.g., at time t1 shown in FIG. 18(A)). This is because the PCR packet is transmitted at the rate of at least one packet per 0.1 second in the MPEG-2 system.

If the PCR packet (in this case, the third PCR packet) is detected in Step S56, the synchronous information processing circuit 213 goes to Step S57. In Step S57, the circuit 213 calculates the synchronous information that is to be written into the third PCR packet. More specifically, the synchronous information processing circuit 213 acquires the PCR value E3 (FIG. 18(C)) of the third PCR packet. Next, the synchronous information processing circuit 213 holds the count value N3 when the third PCR packet is detected. Further, the synchronous information processing circuit 213 substitutes the PCR value E1, PCR value E3, count value N3 and reference clock value B in the following equation (2), thereby calculating synchronous information:

Synchronous information =((PCR value E3 −PCR value E1)− (count value N3−reference clock value B)) ×3240000÷(count value N3 −reference clock value B)) (2)

Namely, the synchronous information indicates the difference (β) between the PCR value and count value N (=3240000), both acquired when the third PCR packet reaches the transmitting apparatus 201 at time (t1) when the count value N becomes 3240000, said difference (β) obtained by subtracting difference (α) between the PCR value E3 (i.e., the count of system clocks of the system encoder) and the count value N3 (i.e., the count of clocks generated by the PLL circuit 217 and synchronous with the network clock of the network 202).

Next, in Step S58, the synchronous information processing circuit 213 writes the synchronous information calculated in Step S57 into the third PCR packet. More precisely, the synchronous information processing circuit 213 writes the synchronous information changes the synchronous byte (47 h) in the header field o the third PCR packet, to the synchronous information that has been calculated.

After the synchronous information processing circuit 213 changes the synchronous byte in Step S55 or Step S58, it goes to Step S59. In Step S59, the circuit 213 subtracts 39 h from the synchronous byte. The synchronous byte of the PCT packet that contains no synchronous information (i.e., the byte changed to −128 in Step S55) is thereby changed to 47 h. Thus, the synchronization process, which has been explained with reference to the flowchart of FIG. 13 or FIG. 14, establishes the synchronization of the MPEG transport stream packet in the receiving apparatus 102.

Next, in Step S60, the synchronous information processing circuit 213 adds the synchronous information obtained in Step S57 to 3240000 (clocks), defining the resultant information as the reference clock value B. Further, the circuit 213 adds the synchronous information to the offset value O and writes the offset value O into the memory 215. That is, the synchronous information is calculated based on the undated reference clock value B and offset value O when the next PCR clock is input.

The reference clock value B (42 bits), offset value O (42 bits) and flag (1 bit) are stored into the memory 215 associated with the PID of the program when the synchronous information processing circuit 213 carries out the process described above.

Figure 19:
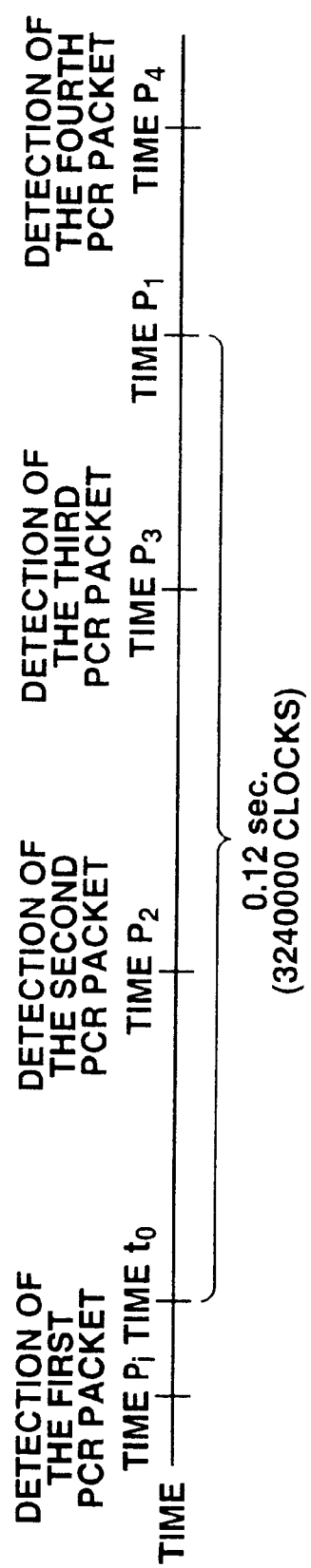
FIG. 19 is a timing chart explaining the process of generating the synchronizing data.

In the embodiment described above, the second PCR packet is detected (input to the transmitting apparatus 201) after time t0 and before time tl (FIG. 18(A)), as is illustrated in FIG. 18. Nonetheless, as shown in FIG. 19, similar process may be performed when the third PCR packet is input during that period. In this case, the value 47 h (i.e., the value 39h subtracted from −128) is set as the value for the synchronous byte in the header field of the second and third PCR packets, and the synchronous information calculated by the process of Step S57 is written into the synchronous byte of the fourth PCR packet.

The processes described above are performed one PID (on one program). Nonetheless, as shown in FIG. 20, the processes my be effected on a plurality of programs (e.g., two programs). In this case, synchronous information is calculated in the same way as described above and is written into a specific PCR packet.

FIG. 20(A) is identical to FIG. 18(B), and FIG. 20(B) is a timing chart explaining how synchronous information is generated for other programs. In the case of FIG. 20(B), the reference clock value B is set at a position isolated by an offset value O1 from the count value N10 in order to effect the above-mentioned process of generating synchronous information. The offset value O and reference clock B are stored into the memory 215, associated with the PID of the program.

The amount of the synchronous information will now be described. In accordance with the MPEG-2 system standards, a 27 MHz clock used as system clock (e.g., the system clock of the system encoder, or the clock generated by the PLL circuit 217 of the transmitting apparatus 201 (hereinafter referred to as "clock S") ) has an error tolerance of+/−30 ppm (parts per million). In other words, the frequency of the clock of the system encoder and the frequency of the clock S may fluctuate in the range of(27 MHz−810 (=27×10$^{-6}$) Hz) to (27 MHz+810 Hz).

The difference in frequency between the clock of the system encoder and the clock S is maximal when, as shown in FIG. 21, the system clock has frequency of 27 MHz+810 Hz (FIG. 21(A)) and the clock S has frequency of 27 MHz−810 Hz (FIG. 21(C)), or when, as shown in FIG. 22, the system clock has frequency of 27 MHz−810 Hz (FIG. 22(A)) and the clock S has frequency of 27 MHz +810 0Hz (FIG. 22(C)).

If the actual frequency is 27 MHz, the number of clocks counted for one second in the case of FIG. 21 is 27×10$^6$ in the case o FIG. 21. In the case of the system encoder shown in FIG. 21(B) and FIG. 21(A), the number is ($27 \times 10^6$30 810). In the case of the clock S (FIG. 21(C)), the number is ($27 \times 10^6$–810). Similarly, the number of clocks counted for one second is ($27 \times 10^6$–810) for the system clock of the system encoder (FIG. 22(A)), and is ($27 \times 10^6$+810) for the clock S (FIG. 22(C)). Thus, the difference between the number of system clocks and the number of clocks S, counted for one second when the frequency difference between the system clock and clock S is maximal is:

$$(27 \times 10^6 + 810) - (27 \times 10^6 - 810) = 1620$$

The synchronous information described above indicates the difference between the system clock of the system encoder and the clock S (i.e., the difference in numbers of clocks counted during a period between the arrival of a PCR packet and that of another PCR packet at the transmitting apparatus 201. The synchronous information is calculated by plotting the numbers N of clocks S counted, on the time axis of the PCR. It is therefore necessary to find the maximal amount of synchronous information in accordance with the time axis of the PCR, too. In this case, the MPEG transport stream packet contains at least one synchronous information item, for 0.12 seconds (=324000/27000000). Hence, the synchronous information represents needs to represent a difference of at most 0.12 seconds (i.e. the difference in numbers of clocks counted for 0.12 seconds). That is, the synchronous information reaches the greatest amount in positive value in the condition illustrated in FIG. 21. The maximum amount of the information is 195, as is given below:

$$((1+30 \text{ ppm})/(1-30 \text{ ppm})-1) \times 27 \text{ MHz} \times 0.12s = 195$$

information (ranging from –128 to 128) can be represented by 8 bits (i.e., one byte).

In this case, the synchronous information has a value ranging from –125 to 125. If it has any other value, it will have such meaning as is shown in FIG. 23. The value of –128, for example, means that no synchronous information has been set. That is, the synchronous byte is set to –128 in Step S52, indicating that the TS packet will contain no synchronous information.

Figure 24:
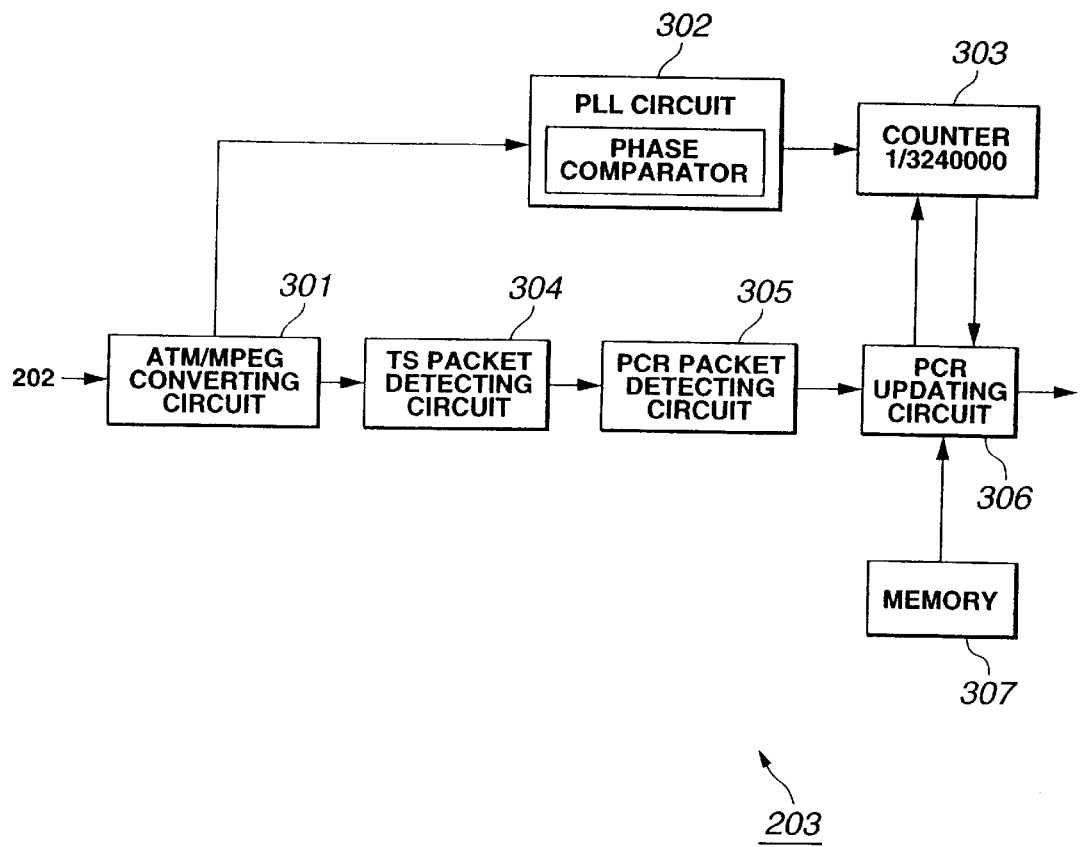
FIG. 24 is a diagram showing the structure of the receiving apparatus.

The value of –127, for example, means that the transmitting apparatus 201 has made an error. The error may be the generation of a large jitter in a PCR packet, isolating the PCR packet excessively from another. In such a case, the synchronous information falls outside the range of –125 to 125. The values of –126, 126 and 127 are reserved ones FIG. 24 shows a structure the receiving apparatus 203 may have. In the apparatus 203, an ATM/MPEG converting circuit 301 converts ATM cells supplied from the transmitting apparatus 301 via the network 202, to an MPEG transport stream packet. The MPEG transport stream packet is output to a TS transport synchronizing circuit 304. The ATM/MPEG converting circuit 301 generates an 8 Khz clock synchronized with the network 202, from the ATM cells the circuit 301 has received. The 8 Khz clock is output to a PLL circuit 302. The PLL circuit 302 has a structure similar to that of the PLL circuit 217 shown in FIG. 11. (The circuit 302 includes a phase comparator circuit.) Therefore, the structure of the PLL circuit 302 will not be described in detail. The PLL circuit 302 generates a 27 MHz clock synchronized with This equation means that the cycle (1/(27 MHz –810 Hz))(time) of the clock S is normalized with the cycle (1/(27 MHz +810 Hz)) of the system clock, in accordance with the time axis of the PCR, the difference between the duration of the normalized clock S (i.e., the duration of clock S in the PCR time axis) and the duration of the PCR (i.e., one unit time) is obtained, and the difference in number between the system clocks and clocks generated for 0.12 seconds is calculated from the difference in terms of duration.

In the condition of FIG. 22, the amount of the synchronous information has the maximal negative value of –195, as shown below:

$$((1-30 \text{ ppm})/(1+30 \text{ ppm})-1) \times 27 \text{ MHz} \times 0.12s = -195$$

In view of the foregoing, the synchronous information can take a value within the following range:

$$-195 <= \text{synchronous information} =< 192$$

Thus, 9 bits are required to constitute the synchronous information. (In units of bytes, two bytes are required to provide the synchronous information.) Even if 8 bits, one bit less than the number of bits required, constitute the synchronous information, an error of only one bit (i.e., one clock more or less) will be generated. This error does not fall outside the jitter-tolerance range defined by the MPEG-2 system standards. The jitter standard of the MPEG-2 system is +/–50 ns. This value is equivalent to +/–13.5 clocks (=+/–500 nsec×27 MHz). Obviously, an error of +/–1 clock falls within the clock-number tolerance range. Therefore, the synchronous the clock supplied from the ATM/MPEG converting circuit 301. The 27 MNz clock is supplied to a counter 303.

The counter 303 divides the frequency of the 27 MHz clock supplied from the PLL circuit 302 with a division ratio of 1/3240000, thus generating clocks. The counter 203 counts these clocks, generating a counter value M. The counter value M is supplied to a PCR updating circuit 306.

The TS transport synchronizing circuit 304 performs the same function as the TS packet synchronizing circuit 211 shown in FIG. 11. That is, the circuit 304 establishes synchronization of the MPEG transport stream packet supplied from the ATM/MPEG converting circuit 301, by effecting the processes shown in the flowcharts of FIGS. 13 and 14. The packet is output to a PCR packet detecting circuit 305.

Figure 14:
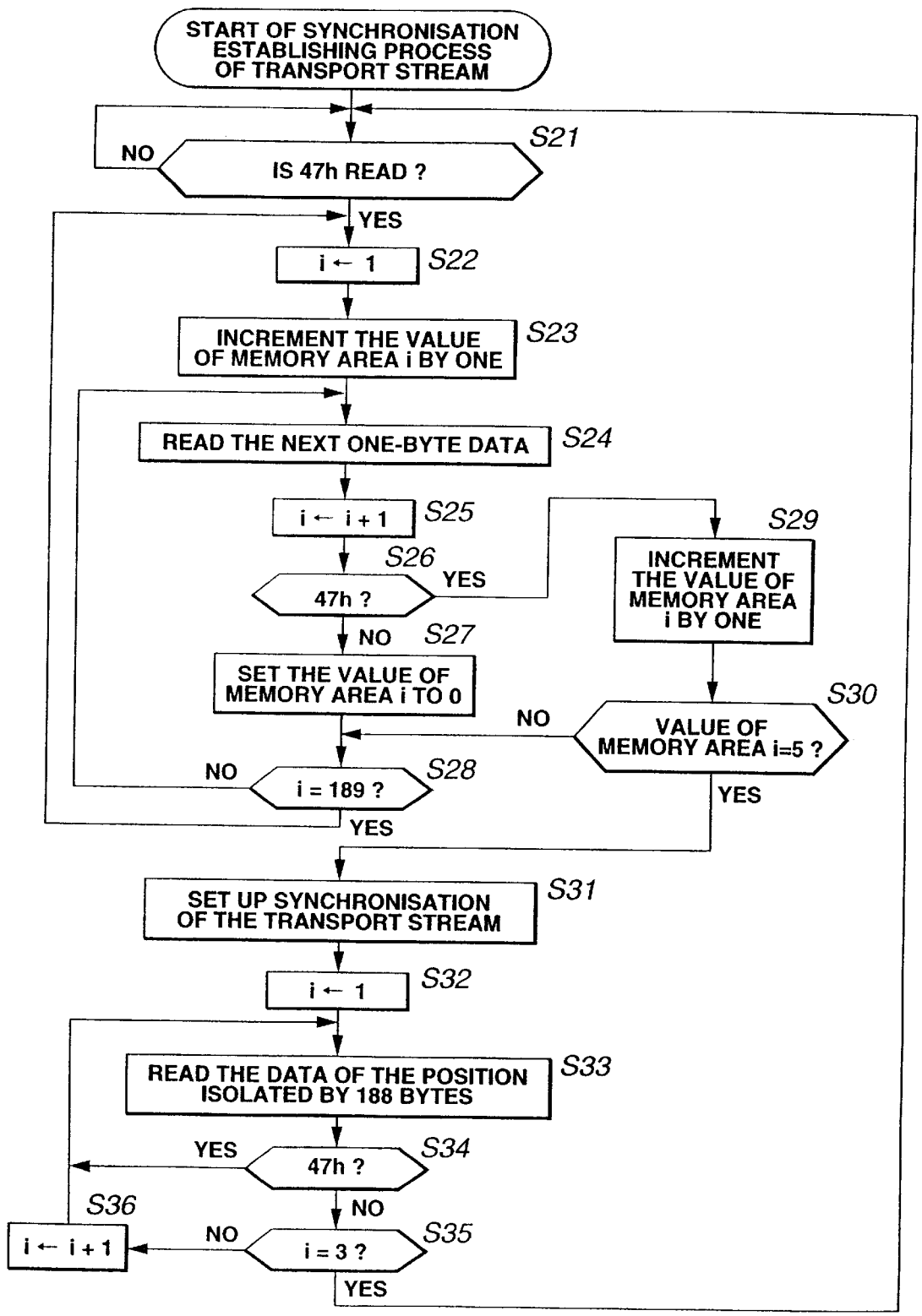
FIG. 14 is another flowchart explaining the synchronization setup process.
Figure 15:
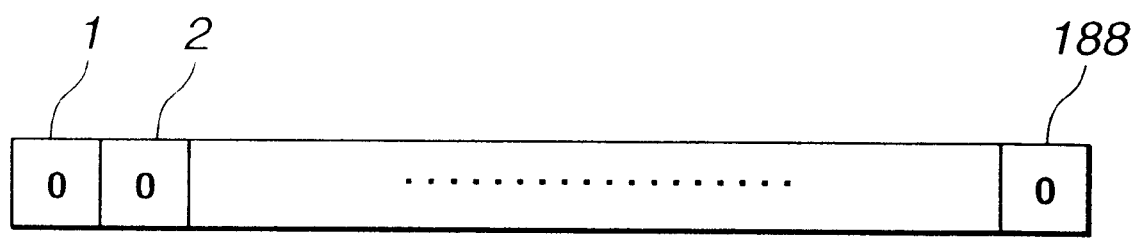
FIG. 15 is a diagram illustrating a 47 h count circuit.

To establish the synchronization by performing the processes shown in the flowchart of FIG. 14, the TS transport synchronizing circuit 304 may use the 47 h counter (FIG. 15). It is possible not to reset the value of the memory area i of the 47 h counter when the PCR packet is input which contains the synchronous information. This will be described in more detail, with reference to FIG. 25.

Figure 25:
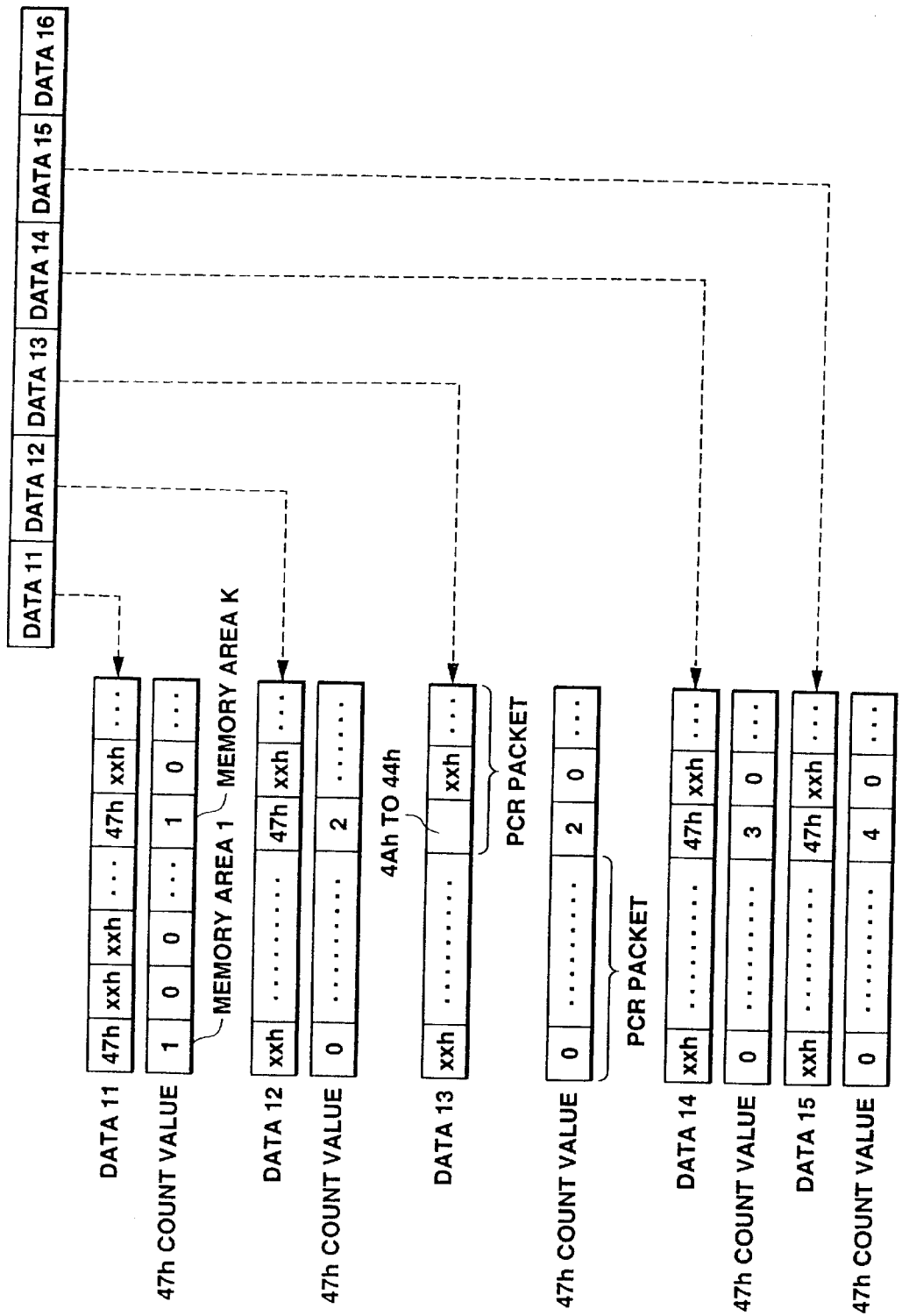
FIG. 25 is a diagram explaining the synchronization setup process.

The data 11 and the data 12 are read, whereby the value of 2 is stored in the memory area k. When any value ranging from 4 Ah to 44 h is read from a position isolated by k bytes from the head of the data 13, the value in the memory area k is not reset to 0 (that is, the value of 2 is held in the memory area k). This is because the value ranging from 4 h to 44 h is regarded as the head of the PCR packet, and frame synchronization is thereby established. In FIG. 25, "xxh" indicates any data other than 47 h and 4 h to 44 h .

The PCR packet detecting circuit 305 determines whether the PCR packet condition has been set or not, by referring to the header field and adaptation field of the MPEG transport stream packet input. If it is determined that the PCR packet condition has been set, the PCR packet detecting circuit 305 generates a PCR packet detecting signal. The PCR packet detecting signal is output to the PCR updating circuit 306.

The PCR updating circuit 306 reads the synchronous information from the PCR packet (containing the synchronous information) and calculates a PCR value D. The circuit 306 writes (or updates) the PCR value D into the PCR packet. The process the PCR updating circuit 305 performs will be later described in detail. The data the PCR updating circuit 306 requires to calculate the PCR value D is stored in a memory 307.

Figure 26:
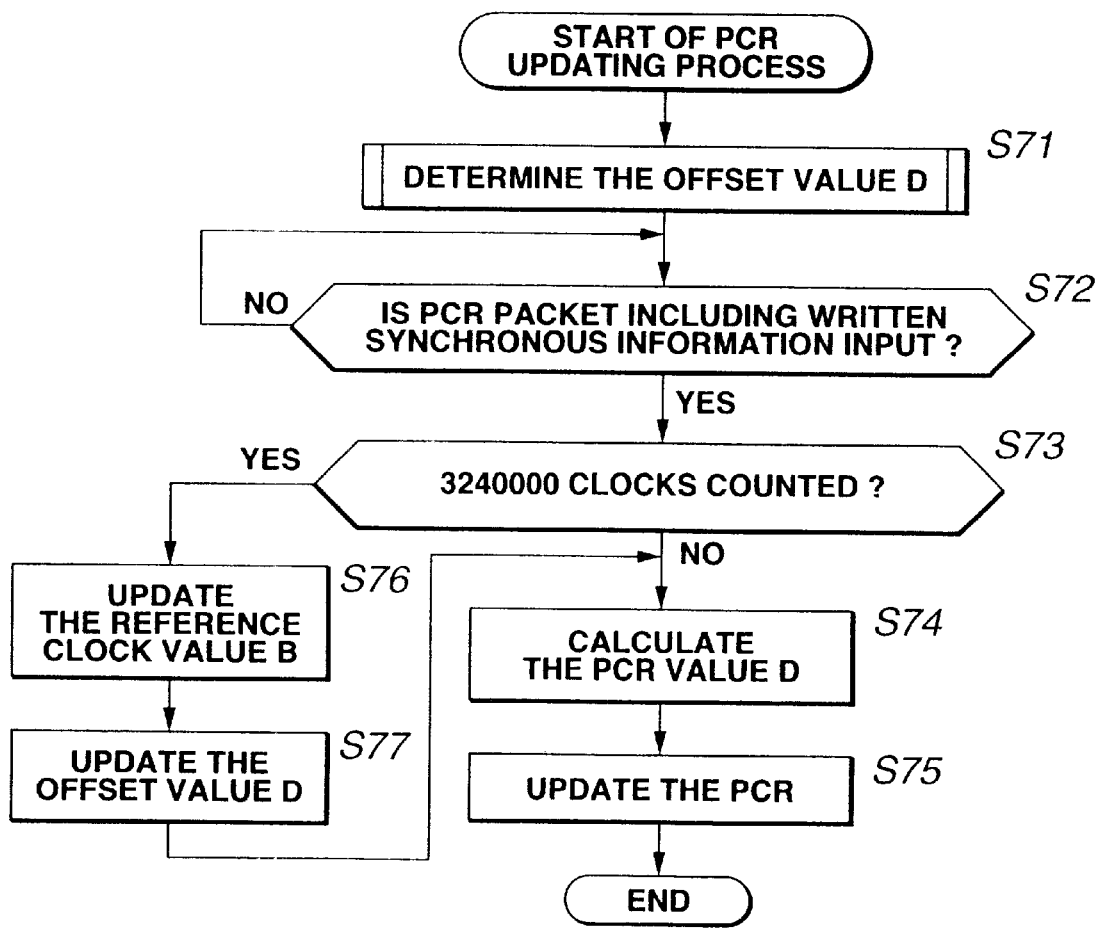
FIG. 26 is a flow chart explaining the process of updating the PCR.
Figure 27:
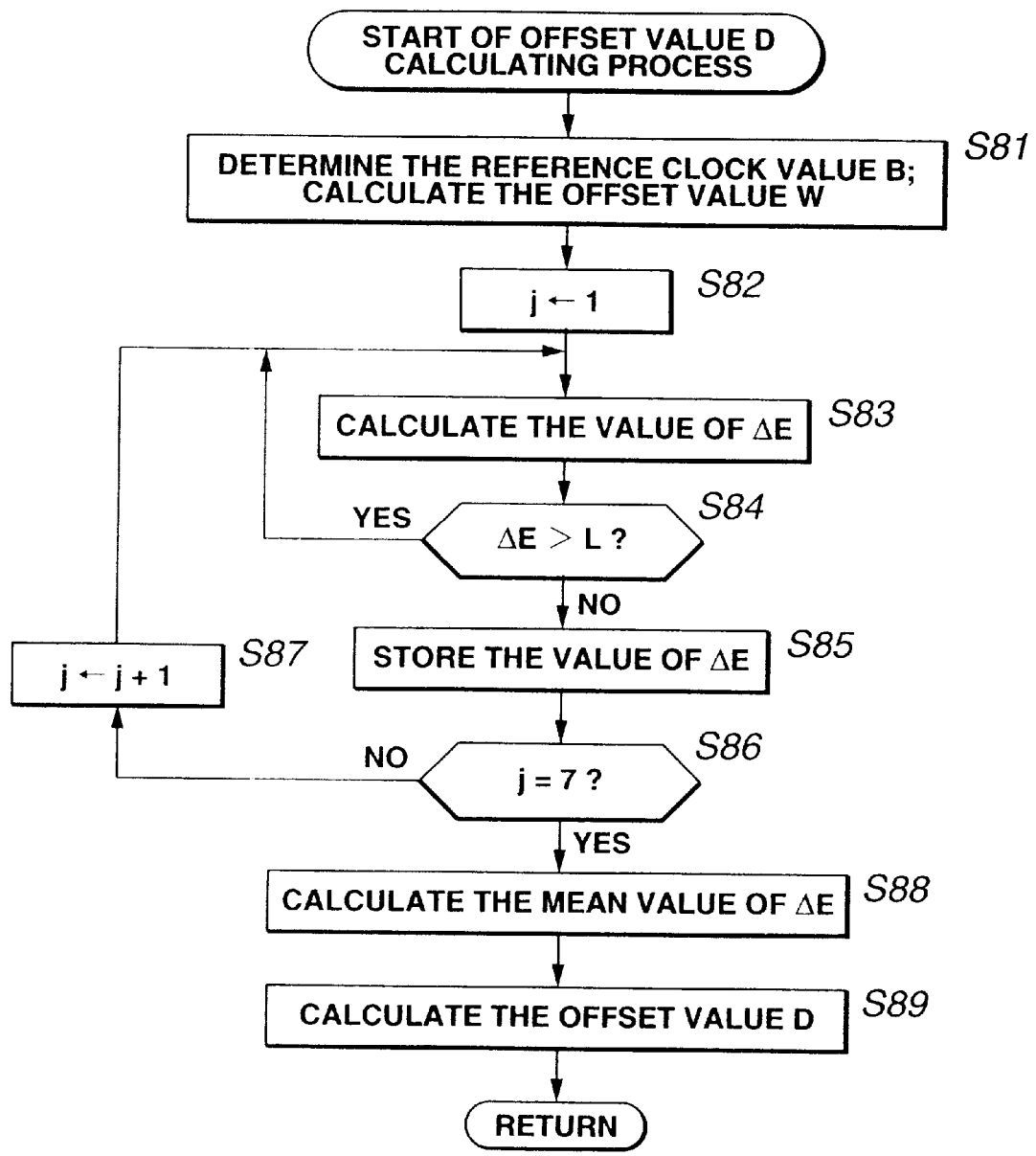
FIG. 27 is a flowchart explaining the process of calculating an offset value.

How the PCR updating circuit 306 operates to update the PCR value of the PCR packet will be described, with reference to the flowchart of FIG. 26. In the TS packet synchronizing circuit 304, the PCR updating circuit 306 determines the offset value D in Step S71 after the MPEG transport stream packet has been synchronized. The flowchart of FIG. 27 explains this process in detail. That is, in Step S81, the PCR value E of the PCR packet is obtained. The PCR value E is defined as reference clock value B. The PCR updating circuit 306 subtracts the reference clock value B from the counter value M that was supplied from the counter 303 when the PCR packet was input. The circuit 306 calculates an offset value M and writes the same into the memory 307.

In Step S82, the PCR updating circuit 306 sets 1 as the counter value j. In step S83, the circuit 306 reads the PCR value E of the next PCR packet input, calculating a difference value ΔE from the reference clock value B. In Step S84, the PCR updating circuit 306 determines whether or not the difference ΔE is greater than a prescribed limit value L. If the difference value ΔE is found not greater than the limit value L, the process goes to Step S85. In Step S85, the PCR updating circuit 306 stores the difference value ΔE into the memory 307. If the is found to be greater than the limit value L in Step S84, the process returns to FIG. Step S83.

In Step S86, the PCR updating circuit 306 determines whether the counter value j has becomes 7 or not. If the valuej is found 7, the process goes to Step S87. In Step S87, the countervaluej is incremented by one. Then, the process returns to Step S83, whereby the subsequent steps are performed on the next PCR packet input.

Figure 28:
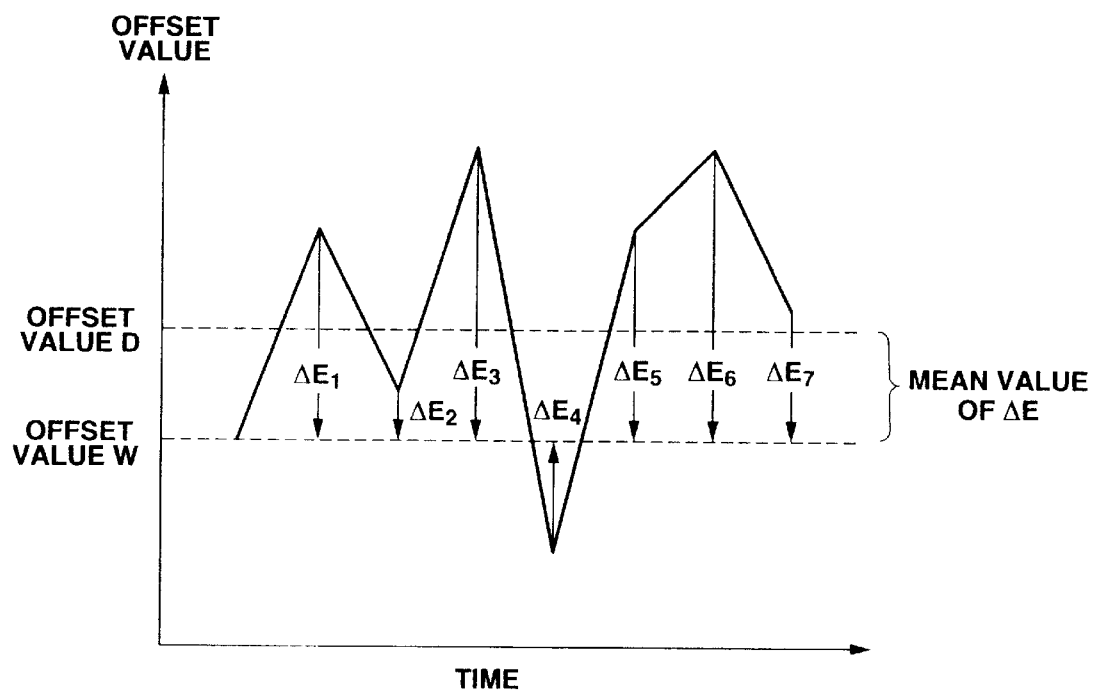
FIG. 28 is a diagram explaining the process of calculating an offset value.

If the counter value j is found to be 7 in Step S86, that is, if seven values ΔE1 to ΔE7 are calculated and stored into the memory 307 as shown in FIG. 28, the process goes to Step S88. In Step S88, the PCR updating circuit 306 divides the total of the values ΔE by 7, thus calculating an average of the values ΔE by 7, as indicated by the following equation (3). The mean value, thus obtained, is stored into the memory 307.

$$\text{Mean value of } \Delta Es = (\Delta E1 + \Delta E2 + \Delta E3 + \Delta E4 + \Delta E5 + \Delta E6 + \Delta E7)/7 \quad (3)$$

Next, in Step S89, the PCR updating circuit 306 adds the mean value to an offset value W, thus calculating an offset value D (FIG. 28) as shown in the following equation (4):

$$\text{Offset value D} = \text{Offset value W} + \text{mean value of } \Delta Es \quad (4)$$

The process completes when the offset value D is calculated as indicated above. Thereafter, the operation goes to Step S72. When the offset value D is calculated (at time t10 in the example of FIG. 29), the PCR updating circuit 306 sets a specific flag (1 bit) in the memory 307, indicating that the offset value D has been calculated. At the same time, the PCR updating circuit 306 instructs the counter 303 to reset the clock value M.

In Step S72, the PCR updating circuit 306 waits until a PCR packet containing the synchronous information is input. When such an PCT packet is input, the PCR updating circuit 306 goers to Step S37 and determines whether the counter 303 has finished counting 3240000 clocks after it had been reset in Step S71. If it is determined that the counter 303 has not finished counting 3240000 clocks, the process goes to Step S74. Note that the first PCR packet is different from the first PCR packet explained in conjunction with the transmitting apparatus 201.

Figure 29A:
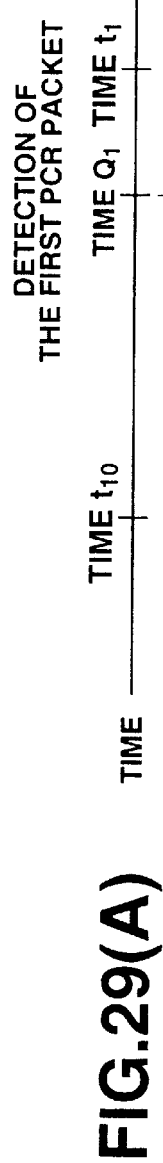
FIG. 29(A) and FIG. 29(B) are a timing chart explaining the process of updating the PCR.
Figure 29B:
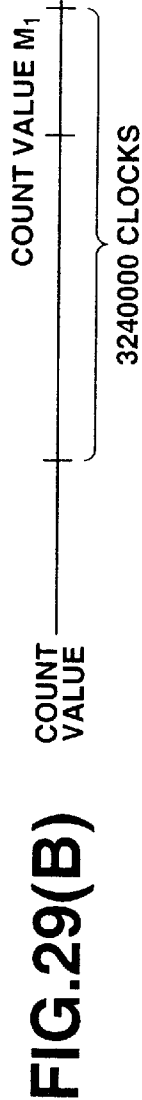
Figure 30:
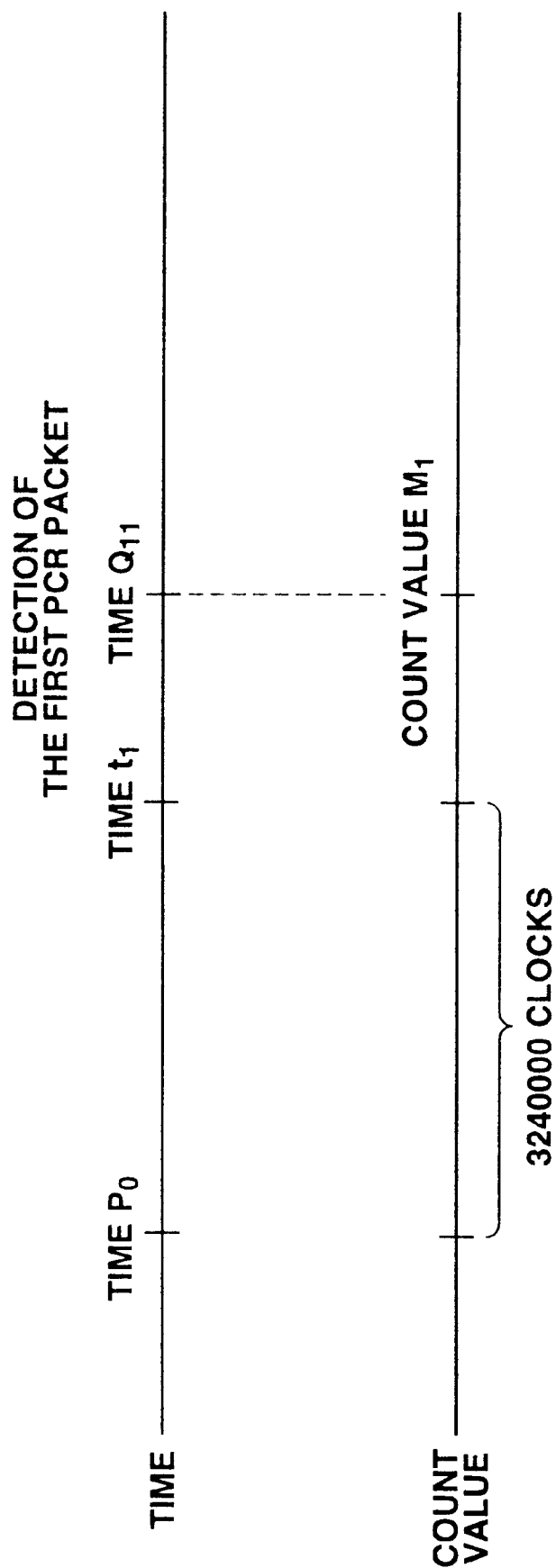
FIG. 30 is another timing chart explaining the process of updating the PCR.

In Step S74, the PCR updating circuit 306 calculates a PCR value D. Assume that, as shown in FIG. 29, a PCR packet (i.e., the first PCR packet) containing the synchronous information) is input after the counter value M is reset in Step S71 and before 340000 clocks are counted. Then, the PCR updating circuit 306 acquires the synchronous information of the first PCR packet input. Next, the PCR updating circuit 306 holds the counter value M1 (FIG. 29(B)) supplied from the counter 303 when the first PCR packet is input. The PCR updating circuit 306 substitutes the count value M1, offset value D, synchronous information and reference clock value B into the following equation (5), thus calculating a PCR value D:

$$\text{PCR value D} = (\text{Count value N1} + \text{offset value D} + \text{synchronous information} \times (\text{count value N1} - \text{reference clock B})/3240000 \quad (5)$$

In Step S75, the PCR updating circuit 306 updates the PCR value E1 of the first PCR packet, obtaining a PCR value D. This PCR value D is output to a decoder (not shown).

If it is determined in Step S73 that 3240000 clocks have been counted, that is, if the first PCR packet (containing the synchronous information) is input after 3240000 clocks have been counted, the process goes to Step S76, in which the reference clock value B is updated. More precisely, the PCR updating circuit 306 reads the synchronous information from the first PCR packet, adds 3240000 to the information and over-writes the resultant sum in the memory 307 as the reference clock value B. The reference clock value B is thereby updated.

In Step S77, the PCR updating circuit 306 updates the offset value D. In practice, the PCR updating circuit 306 reads the offset value D from the memory 307, adds the synchronous information contained in the first PCR packet to the offset value D and over-writes the resultant sum into the memory 307 as new offset value D. Thus, the offset value D is updated.

Thereafter, the process returns to Step S74. The PCR updating circuit 306 calculates a PCR value D from the reference clock value B and the offset value D, both updated.

In the receiving apparatus 203, the process of updating the PCR, described above, is performed for each program (e.g., each channel). In other words, the process is carried out for a plurality of programs.

As described above, the synchronous information is written in the transmitting apparatus 201 and transmitted to the receiving apparatus 203 via the network 202. In the receiving apparatus 203, the PCR is updated in accordance with the synchronous information. Therefore, the delay fluctuation can be controlled for a plurality of programs (e.g., 8192 PIDs).

Figure 1:
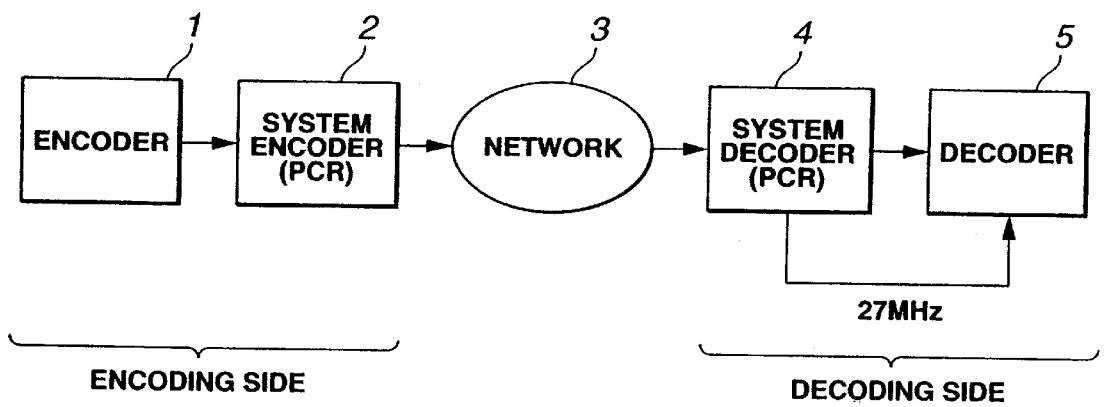
FIG. 1 is a block diagram showing the structure of a conventional data transmission system.
Figure 2:
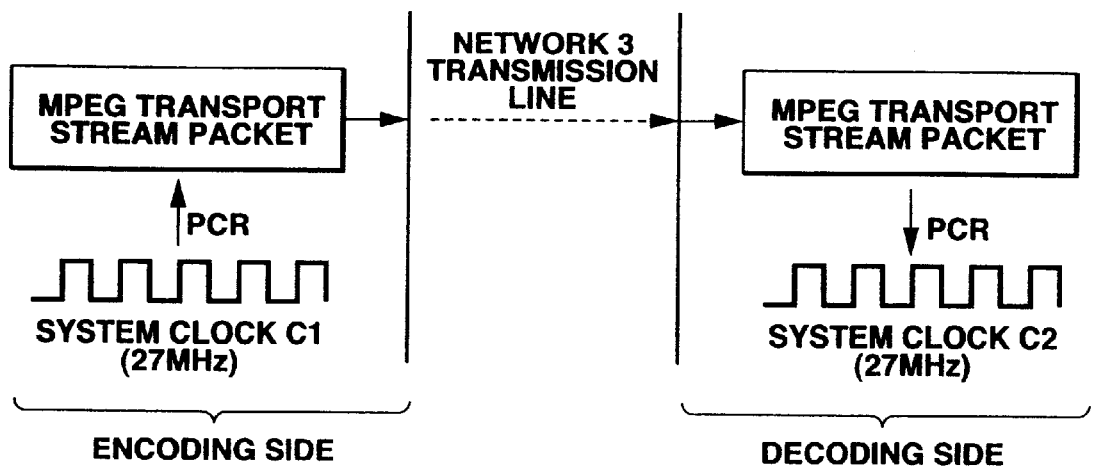
FIG. 2 is a diagram for explaining a PCR.
Figure 3:
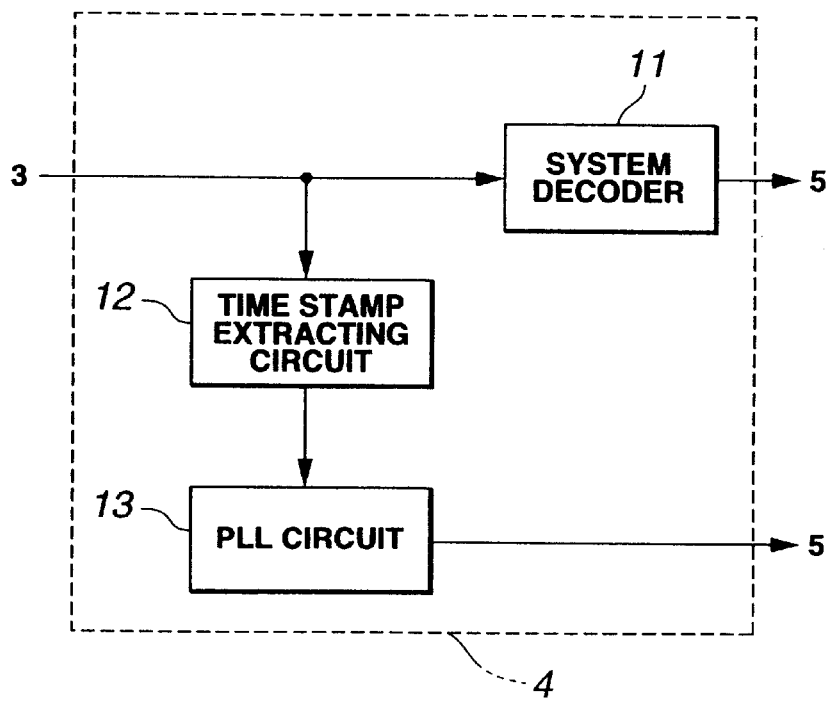
FIG. 3 is a block diagram illustrating the structure of the system decoder incorporated in the data transmission system.
Figure 4:
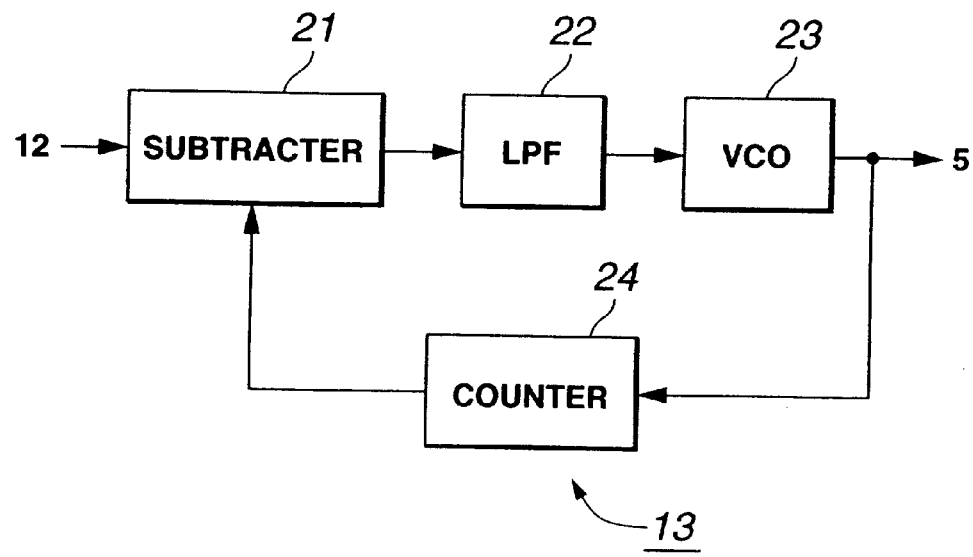
FIG. 4 is a block diagram depicting the structure of the PLL circuit provided in the system decoder.
Figure 5:
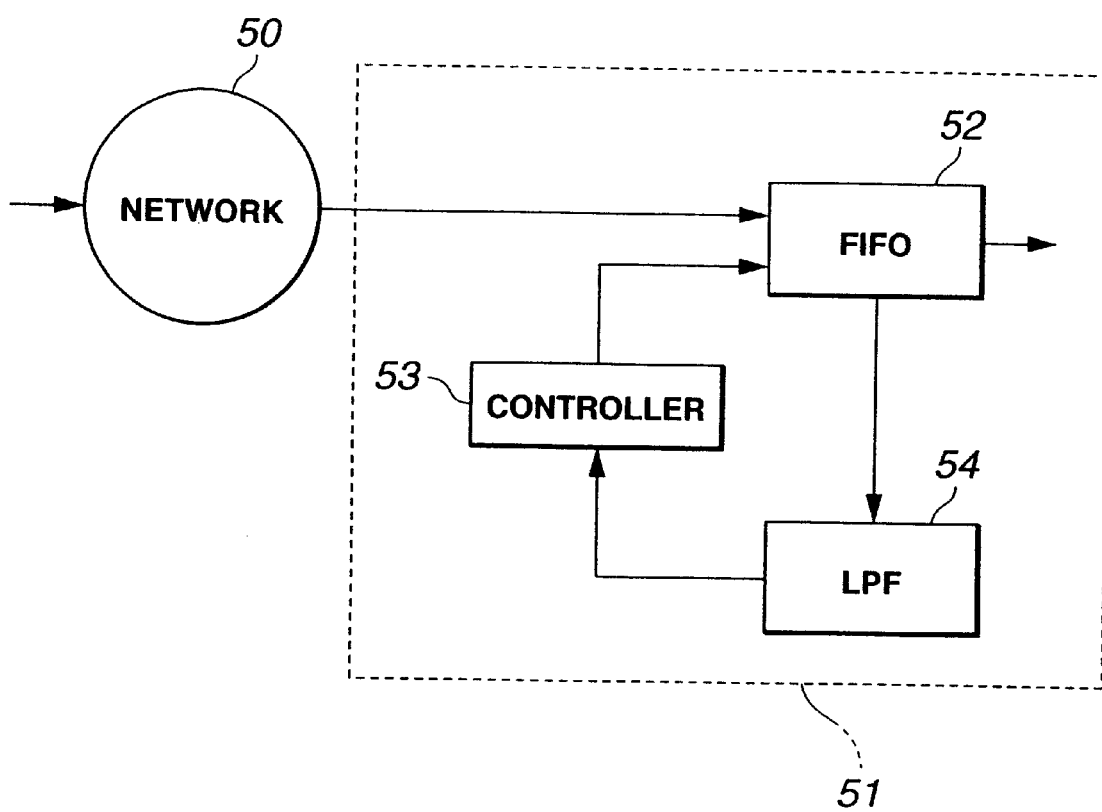
FIG. 5 is a block diagram showing the structure of an adaptive clock circuit.
Figure 31:
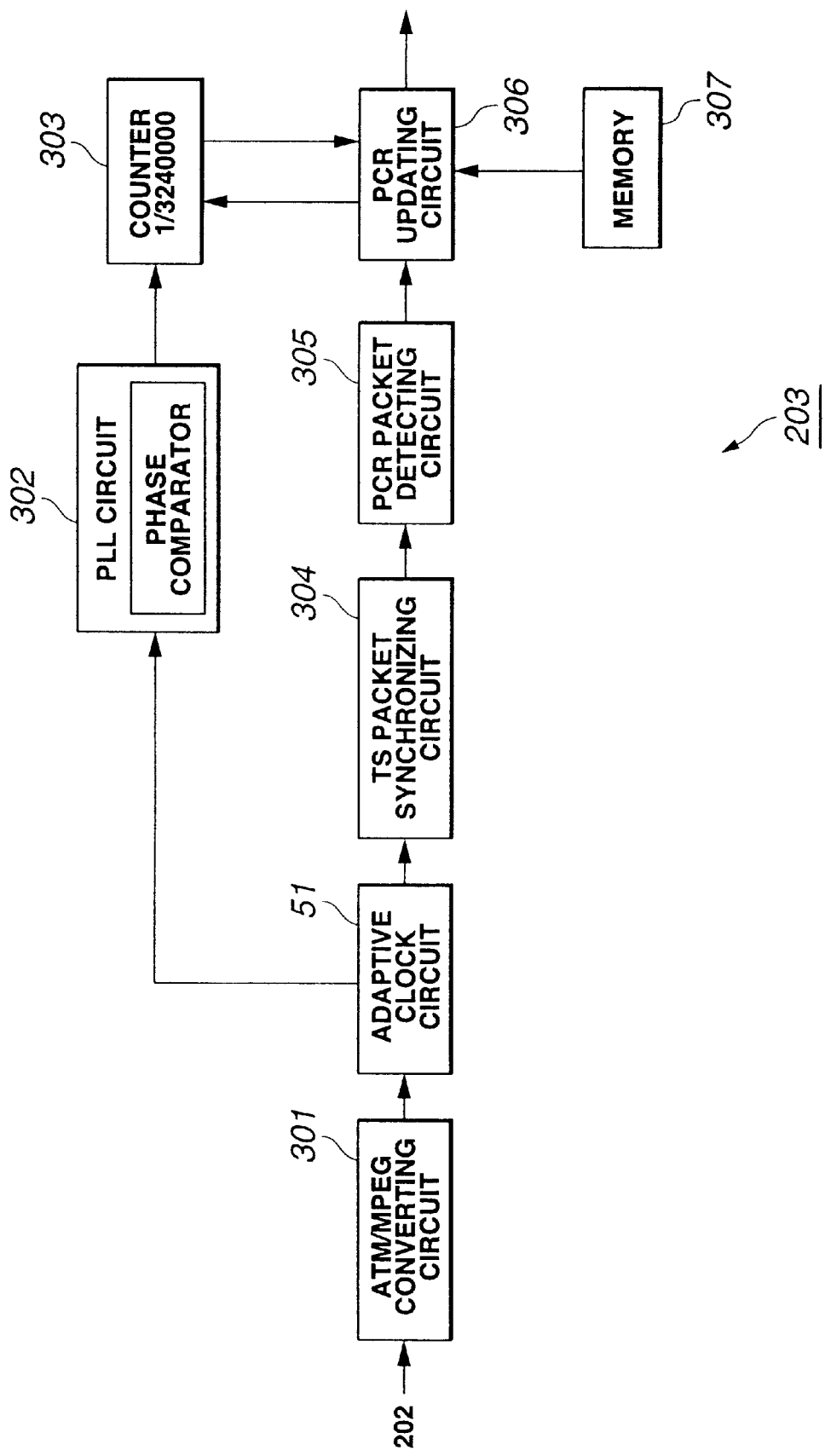
FIG. 31 is a block diagram showing another structure of the receiving apparatus.
Figure 32:
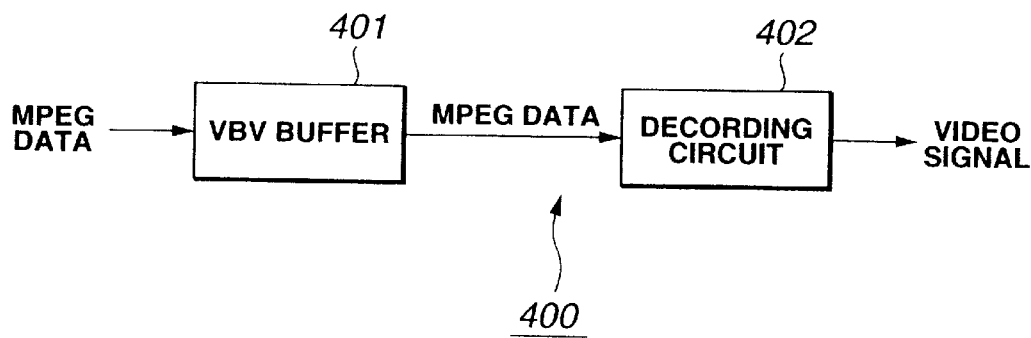
FIG. 32 is a block diagram illustrating the structure of a decoder.

Another example of the receiving apparatus 203 will be described, with reference to FIG. 31. The components equivalent to those shown in FIG. 24 are designated at the same reference numerals. As shown in FIG. 31, an adaptive clock circuit 51 of the same type as shown in FIG. 5 is provided between an ATM/MPEG converting circuit and a TS packet synchronizing circuit 304. A PCR value D can therefore be calculated from an MPEG transport stream packet in which the fluctuation is absorbed to a certain extent by means of the adaptive lock circuit 51. As a result, breakdown of a VBV buffer 401 is prevented as shown in FIG. 33, in the decoder 400 shown in FIG. 32 that receives the MPEG transport stream packet (containing a PCR packet) from the receiving apparatus 203.

Figure 33:
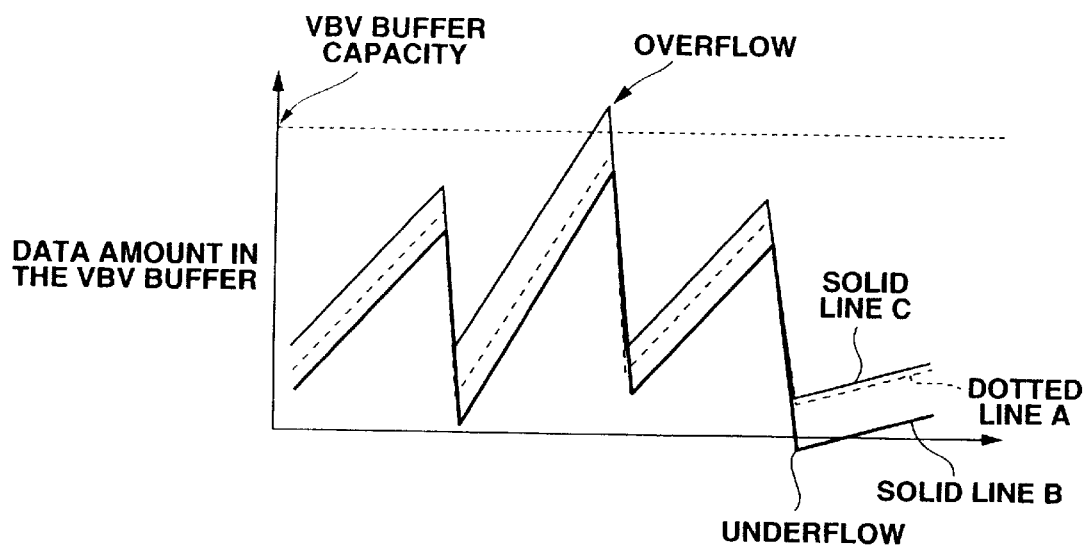
FIG. 33 is a diagram depicting how the amount of data stored in a VBV buffer changes.

If no delay fluctuation has not occurred in the MPEG transport stream packet input to the decoder 400, the locus of the amount of data stored in the VBV buffer 401 becomes as is indicated by the dotted line A in FIG. 33. Therefore, the VBV buffer 401 never undergo overflow or underflow. However, the locus of the amount of the data stored in the VBV buffer may become underflow as indicated by the solid line B if the MPEG transport steam packet arrives with a certain delay. Moreover, if the MPEG transport stream packet arrives too early, the locus will probably become overflow as is indicated by the solid line C.

Figure 34:
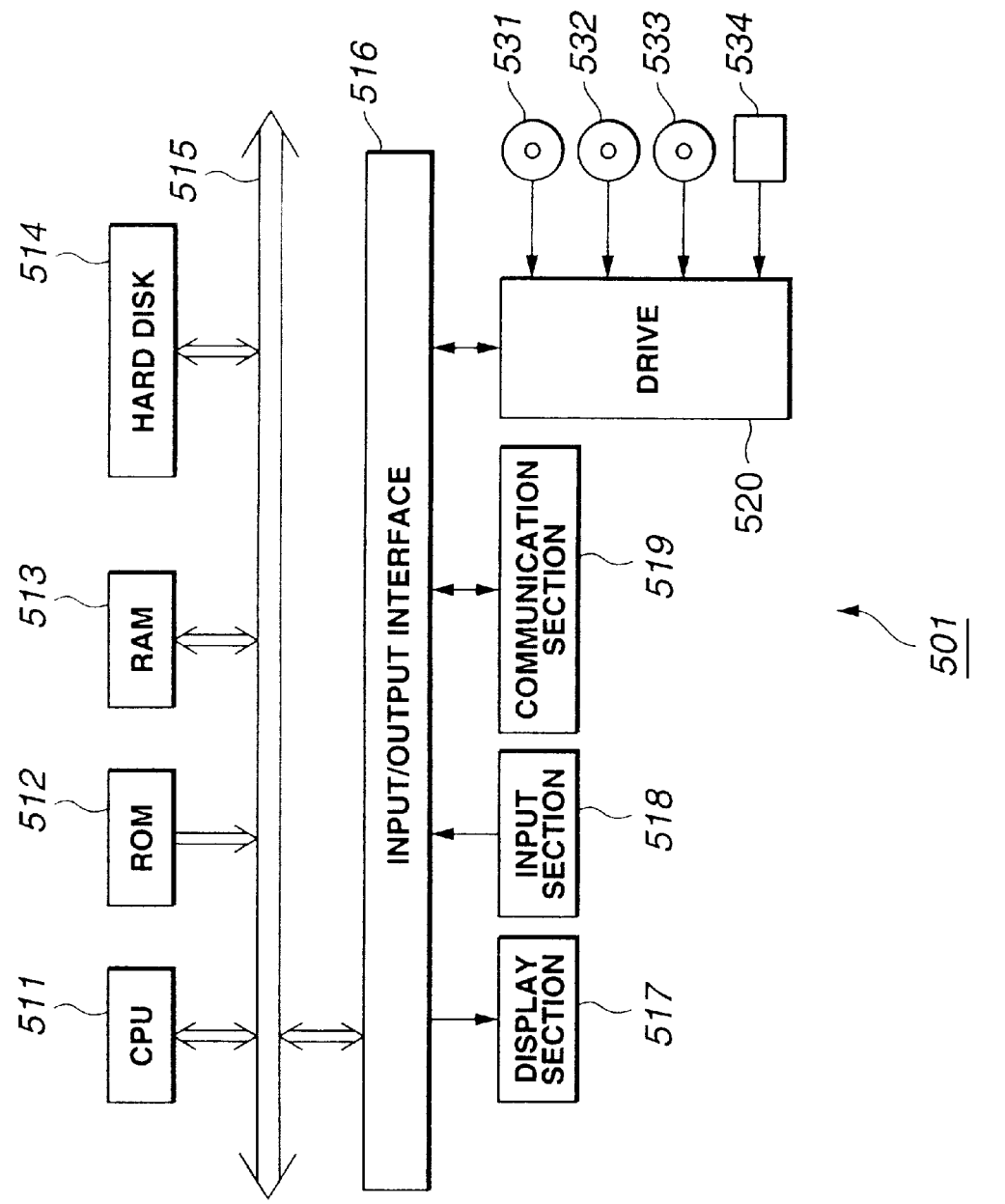
FIG. 34 is a block diagram showing the structure of a computer.

FIG. 34 is a block diagram showing the structure of a computer 501 that functions as the transmitting apparatus 201 or the receiving apparatus 203, either described above. A bus 515 connects an input/output interface 516 to a CPU (Central Processing Unit) 511. The CPU 511 may receive a user's instruction via the input/output interface 516 from input section 518 that comprises a keyboard and a mouse. Upon receipt of the instruction, the CPU 511 loads a program into a RAM (Random Access Memory) 513 from, for example, a ROM (Read Only Memory) 512, a hard disk 514 or a magnetic disk 531, an optical disk 532, a magneto optical disk 533 or a semiconductor memory 534. The disks 531 to 533 and the memory 534 are inserted in a drive 520. Various processes (e.g., those explained with reference to the flowcharts of FIGS. 13, 14, 17, 26 and 27) are thereby performed. Further, the CPU 511 outputs the results of the processes via the input/output interface 516 to a display section 517 having, for example, an LCD (Liquid Crystal Display), whenever necessary. The program is recorded on the hard disk 514 or in the ROM 512 and may be supplied to users, along with the computer 501. Alternatively, the program may be recorded in a package medium such as the magnetic disk 531, optical disk 532, magnetooptical disk 533 or semiconductor memory 534, and the package medium may be supplied to users. Still alternatively, the program may be stored into the hard disk 514 from a satellite or a network through a communication section 519.

The step of describing the programs offered by the medium include not only those which are performed sequentially as is described, but also those which are performed in parallel or independently.

In the communication apparatus as defined in claim 1, communication method as defined in claim 4 and medium as defined in claim 5, an error of time stamp is calculated and transmitted if it is isolated by several fixed clocks from the reference clock value. Therefore, the delay fluctuation generated in data can be removed from a plurality of programs.

In the communication apparatus as defined in claim 6, communication method as defined in claim 8 and medium as defined in claim 9, the time stamp is updated on the basis of the error information corresponding to the fixed clock. Delay fluctuation, if any, can therefore be removed from a plurality of programs.

What is claimed is:

1. A communication apparatus connected to an asynchronous network, for transmitting packets of encoded input data in synchronization with a network clock, comprising:

reading means for reading a time stamp in a packet of the encoded input data;

holding means for holding a count value from a counter synchronized with said network clock at the time the time stamp is read;

determining means for determining a reference clock value corresponding to the time from the time stamp read by the reading means;

calculating means for calculating an offset error corresponding to a delay fluctuation between the time stamp of said packet and the network clock; said delay fluctuation resulting from the transmission of packets across said asynchronous network; said offset error being the difference between the reference clock value and the count value;

writing means for writing the offset error calculated by the calculating means into said packet of the encoded input data; and transmitting means for transmitting, to a receiving apparatus, said packet containing the time stamp and the offset error written by the writing means.

2. The communication apparatus according to claim 1, wherein the input data is transport stream packet data corresponding to a plurality of multiplexed video programs.

3. The communication apparatus according to claim 1, further comprising storage means for storing the reference clock value determined by the determining means and the offset error.

4. A communication method, for use in a communication apparatus connected to an asynchronous network, of transmitting packets of encoded input data in synchronization with a network clock, said method comprising the steps of:

a reading step of reading a time stamp in a packet of the encoded input data;

a holding step of holding a count value from a counter synchronized with said network clock at the time the time stamp is read;

a determining step of determining a reference clock value corresponding to the time from the time stamp read in the reading step;

a calculating step of calculating an offset error corresponding to a delay fluctuation between the time stamp of said packet and the network clock; said delay fluctuation resulting from the transmission of packets across said asynchronous network; said offset error being the difference between the reference clock value and the count value;

a writing step of writing the offset error calculated in the calculating step into said packet of the encoded input data; and a transmitting step of transmitting, to a receiving apparatus, said packet containing the time stamp and the offset error written in the writing step.

5. A communication apparatus connected to an asynchronous network, for receiving packets of encoded input data in synchronization with a network clock, comprising:

receiving means for receiving a packet of the encoded input data from said asynchronous network;

first reading means for reading a time stamp in said packet of the encoded input data;

second reading means for reading an offset error contained in the input data;

holding means for holding a count value from a counter synchronized with said network clock at the time the time stamp is read;

first determining means for determining a reference clock value corresponding to the time from the time stamp read by the first reading means and the offset error read by the second reading means;

second determining means for determining an offset value corresponding to a delay fluctuation between the network clock and the time stamp of said packet corrected by the offset error; said delay fluctuation resulting from the transmission of packets across said asynchronous network; said offset value being the difference between the reference clock value and the count value; and updating means for updating the time stamp in said packet of the encoded input data on the basis of the offset value determined by the second determining means.

6. The communication apparatus according to claim 5, further comprising storage means for storing the reference clock value determined by the first determining means and the offset value determined by the second determining means.

7. A communication method, for use in a communication apparatus connected to an asynchronous network, of receiving packets of encoded input data in synchronization with a network clock, said method comprising the steps of:

a receiving step of receiving a packet of the encoded input data from said asynchronous network;

a first reading step of reading a time stamp in said packet of the encoded input data;

second reading step of reading an offset error contained in the input data;

a holding step of holding a count value from a counter synchronized with said network clock at the time the time stamp is read;

a first determining step of determining a reference clock value corresponding to the time from the time stamp read in the first reading step and the offset error read in the second reading step;

a second determining step of determining an offset value corresponding to a delay fluctuation between the network clock and the time stamp of said packet corrected by the offset error; said delay fluctuation resulting from the transmission of packets across said asynchronous network; said offset value being the difference between the reference clock value and the count value; and an updating step of updating the time stamp in said packet of the encoded input data on the basis of the offset value determined in the second determining step.

8. The communication apparatus according to claim 5, wherein the input data is transport stream packet data corresponding to a plurality of multiplexed video programs.

* * * * *